US012693715B2

(12) United States Patent
Shen et al.

(10) Patent No.: US 12,693,715 B2
(45) Date of Patent: Jul. 28, 2026

(54) HINGE MECHANISM AND ELECTRONIC DEVICE

(71) Applicant: Huawei Technologies Co., Ltd., Shenzhen (CN)

(72) Inventors: Hewen Shen, Dongguan (CN); Ding Zhong, Dongguan (CN); Wenwen Wu, Dongguan (CN); Wen Fan, Dongguan (CN); Yuehua Hu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

(21) Appl. No.: 18/930,483

(22) Filed: Oct. 29, 2024

(65) Prior Publication Data

US 2025/0053205 A1 Feb. 13, 2025

Related U.S. Application Data

(63) Continuation of application No. PCT/CN2024/080838, filed on Mar. 8, 2024.

(30) Foreign Application Priority Data

May 12, 2023 (CN) .......................... 202310539481.2

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC .... G06F 1/1681; G06F 1/1652; G06F 1/1616; G06F 1/1618; H04M 1/022; H04M 1/0268; G09F 9/301
See application file for complete search history.

(56) References Cited

U.S. PATENT DOCUMENTS

| | | | | |
|---|---|---|---|---|
| 11,914,433 | B2* | 2/2024 | Liao | H04M 1/0268 |
| 11,977,421 | B2* | 5/2024 | Yang | G06F 1/1681 |
| 2021/0267077 | A1* | 8/2021 | Zhang | H05K 5/0221 |
| 2022/0104370 | A1* | 3/2022 | Wu | G06F 1/1681 |

(Continued)

FOREIGN PATENT DOCUMENTS

| | | |
|---|---|---|
| CN | 114205431 A | 3/2022 |
| JP | 2022518202 A | 3/2022 |
| WO | 2022068211 A1 | 4/2022 |

*Primary Examiner* — Sagar Shrestha
(74) *Attorney, Agent, or Firm* — Slater Matsil, LLP

(57) ABSTRACT

A hinge mechanism includes a main shaft, a rotating module, a first door plate, and a second door plate. The rotating module includes a first rotating component, a second rotating component, a first housing fastening bracket, and a second housing fastening bracket. The first rotating component includes a first support arm, a first connecting member, and a first door plate fastening bracket. The first connecting member is separately and rotatably connected to the first support arm and the first door plate fastening bracket, and the first connecting member is rotatably or slidably connected to the main shaft. The second rotating component includes a second support arm, a second connecting member, and a second door plate fastening bracket. The second connecting member is rotatably connected to the second support arm and the second door plate fastening bracket, and the second connecting member is rotatably or slidably connected to the main shaft.

20 Claims, 12 Drawing Sheets

(56)          References Cited

U.S. PATENT DOCUMENTS

| | | | |
|---|---|---|---|
| 2022/0303371 A1* | 9/2022 | Liao .................... | H04M 1/0216 |
| 2022/0377919 A1* | 11/2022 | Zhang ................... | H04M 1/022 |
| 2023/0244274 A1* | 8/2023 | Lin ........................ | G06F 1/181 |
| | | | 361/679.27 |
| 2023/0409090 A1* | 12/2023 | Hong .................... | G06F 1/1616 |

* cited by examiner

1

HINGE MECHANISM AND ELECTRONIC DEVICE

CROSS-REFERENCE TO RELATED APPLICATIONS

This application is a continuation of International Application No. PCT/CN2024/080838, filed on Mar. 8, 2024, which claims priority to Chinese Patent Application No. 202310539481.2, filed on May 12, 2023. The disclosures of the aforementioned applications are hereby incorporated by reference in their entireties.

TECHNICAL FIELD

This application relates to the field of electronic device technologies, and in particular, to a hinge mechanism and an electronic device.

BACKGROUND

As flexible display technologies gradually become mature, display manners of electronic devices change greatly. A mobile phone with a foldable flexible display, a tablet computer with a foldable flexible display, a wearable electronic device with a foldable flexible display, and the like are an important evolution direction of intelligent electronic devices in the future.

As a key component of a foldable electronic device, a flexible display has a feature of being continuously foldable. A hinge mechanism is used as an important component for implementing a folding function of the foldable electronic device. In a process of unfolding and folding the foldable electronic device, the hinge mechanism may drive the flexible display to be flattened or bent.

In a current foldable electronic device, as a size of a hinge mechanism continuously decreases, when the electronic device is in a folded state, it is increasingly difficult for screen accommodation space formed by the hinge mechanism to meet a bending requirement of a foldable portion of the flexible display, which easily causes extrusion of the flexible display. As a result, it is difficult to ensure structural strength of the flexible display. Based on this, how to ensure structural reliability of the flexible display while implementing a miniaturization design of the hinge mechanism has become an urgent problem to be resolved by a person skilled in the art.

SUMMARY

This application provides a hinge mechanism and an electronic device, to implement a miniaturization design of the hinge mechanism, and improve structural reliability of a flexible display in a rotation process of the hinge mechanism. This improves structural reliability of the electronic device.

According to a first aspect, this application provides a hinge mechanism. The hinge mechanism may be used in a foldable electronic device, the hinge mechanism is disposed opposite to a foldable portion of a flexible display of the electronic device, and the electronic device is unfolded or folded by using the hinge mechanism. Specifically, the hinge mechanism may include a main shaft, a rotating module, a first door plate, and a second door plate. The rotating module includes a first rotating component, a second rotating component, a first housing fastening bracket, and a second housing fastening bracket. The first housing fastening bracket and the second housing fastening bracket are respectively disposed on two opposite sides of the main shaft, the first rotating component is located between the first housing fastening bracket and the second housing fastening bracket, and the second rotating component is located between the first housing fastening bracket and the second housing fastening bracket. The first rotating component may include a first support arm, a first door plate fastening bracket, and a first connecting member. The first support arm is rotatably connected to the main shaft, the first support arm is slidably connected to the first housing fastening bracket, the first door plate fastening bracket is rotatably connected to the second housing fastening bracket, the first connecting member is located between the first support arm and the first door plate fastening bracket, the first connecting member is rotatably connected to the first door plate fastening bracket, and the first connecting member is rotatably connected to the first support arm. In addition, the first connecting member is rotatably connected to the main shaft, or the first connecting member is slidably connected to the main shaft, to limit a motion trajectory of the first connecting member, so that a motion trajectory of pulling the first support arm by the first door plate fastening bracket through the first connecting member can be limited. The second rotating component may include a second support arm, a second door plate fastening bracket, and a second connecting member. The second support arm is rotatably connected to the main shaft, the second support arm is slidably connected to the second housing fastening bracket, the second door plate fastening bracket is rotatably connected to the first housing fastening bracket, the second connecting member is located between the second support arm and the second door plate fastening bracket, the second connecting member is rotatably connected to the second door plate fastening bracket, and the second connecting member is rotatably connected to the second support arm. In addition, the second connecting member is rotatably connected to the main shaft, or the second connecting member is slidably connected to the main shaft, to limit a motion trajectory of the second connecting member, so that a motion trajectory of pulling the second support arm by the second door plate fastening bracket through the second connecting member can be limited. In the hinge mechanism provided in this application, the first door plate may be located on a side that is of the first door plate fastening bracket and that faces the flexible display, and the first door plate is fastened to the first door plate fastening bracket. The second door plate may be located on a side that is of the second door plate fastening bracket and that faces the flexible display, and the second door plate is fastened to the second door plate fastening bracket.

Based on the foregoing hinge mechanism in this application, in a process of the electronic device from an unfolded state to a folded state, when the first housing fastening bracket and the second housing fastening bracket move toward each other, and the first housing fastening bracket drives the first support arm to rotate around the main shaft in a clockwise direction, the first support arm may drive the first connecting member to move toward the first door plate fastening bracket relative to the main shaft, so that the first door plate fastening bracket can be driven to rotate around the main shaft in a counterclockwise direction. When the second housing fastening bracket drives the second support arm to rotate around the main shaft in a counterclockwise direction, the second support arm may drive the second connecting member to move toward the second door plate fastening bracket relative to the main shaft, so that the second door plate fastening bracket can be driven to rotate around the main shaft in a clockwise direction. In a process of the electronic device from a folded state to an unfolded state, when the first housing fastening bracket and the second housing fastening bracket move oppositely, and the first housing fastening bracket drives the first support arm to rotate around the main shaft in a counterclockwise direction, the first support arm may drive the first connecting member to move toward the first support arm relative to the main shaft, so that the first housing fastening bracket can be driven to rotate around the main shaft in a clockwise direction. When the second housing fastening bracket drives the second support arm to rotate around the main shaft in a clockwise direction, the second support arm may drive the second connecting member to move toward the second housing fastening bracket relative to the main shaft, so that the second housing fastening bracket can be driven to rotate around the main shaft in a counterclockwise direction. This can implement folding and unfolding functions of the hinge mechanism.

For some existing hinge mechanisms, to ensure stability of the mechanisms, thickness of a rotating component connected to the main shaft needs to be increased. In this way, both the main shaft and the hinge mechanism are very thick. If the main shaft and the hinge mechanism are forcibly thinned, strength of the rotating component is easily weakened. In addition, when the electronic device falls down, the rotating component has a risk of falling off from the main shaft, which greatly affects reliability of the hinge mechanism. As a result, a service life of the electronic device is shortened. The foregoing hinge mechanism in this application has a simplified structure. According to the foregoing structural relationship, the first connecting member and the second connecting member are slidably or rotatably connected to the main shaft, so that the first support arm, the second support arm, the first door plate fastening bracket, and the second door plate fastening bracket on left and right sides can be linked. Therefore, thickness cross sections of the first connecting member and the second connecting member do not need to be very large, so that the first connecting member and the second connecting member can move through the main shaft. In addition, the first connecting member and the second connecting member are respectively connected to the first support arm (the second support arm) and the first door plate fastening bracket (the second door plate fastening bracket). Therefore, the first connecting member (the second connecting member) extends sufficiently in a direction perpendicular to an axial direction, and has sufficient strength to ensure reliability of the hinge mechanism. This not only reduces thickness of the main shaft and thickness of an entire machine, but also maintains reliability of the hinge mechanism, so that the entire hinge mechanism is light, thin, and reliable.

In this application, a rotating connection between the first connecting member and the first support arm may be classified into a direct rotating connection and an indirect rotating connection. The direct rotating connection means that the first connecting member and the first support arm are directly connected through a rotating shaft, and no other structure is included between the first connecting member and the first support arm. The indirect connection means that another possible connection structure may be further disposed between the first connecting member and the first support arm, and the first connecting member and the first support arm are rotatably connected to the connection structure, to implement a rotating connection. For example, the first rotating component further includes a first connecting rod, the first connecting rod is located between the first support arm and the first connecting member, the first support arm is rotatably connected to the first connecting rod, the first connecting member is rotatably connected to the first connecting rod, and an axis along which the first support arm rotates relative to the first connecting rod is parallel to but not coincident with an axis along which the first connecting member rotates relative to the first connecting rod. According to the hinge mechanism provided in this application, the first connecting member is indirectly and rotatably connected to a first support plate through the first connecting rod, so that functions of folding and unfolding the hinge mechanism can be implemented, and a size of the hinge mechanism can be reduced.

In addition, the second rotating component further includes a second connecting rod, the second connecting rod is located between the second support arm and the second connecting member, the second support arm is rotatably connected to the second connecting rod, the second connecting member is rotatably connected to the second connecting rod, and an axis along which the second support arm rotates relative to the second connecting rod is parallel to but not coincident with an axis along which the second connecting member rotates relative to the second connecting rod, so that the second connecting member can be indirectly and rotatably connected to the second support arm. This can implement folding and unfolding functions of the hinge mechanism, and help reduce a size of the hinge mechanism.

In this application, the first door plate fastening bracket may be rotatably connected to the second housing fastening bracket through a virtual axis. Specifically, a first arc-shaped groove may be disposed at an end portion that is of the first door plate fastening bracket and that faces the second housing fastening bracket, a second arc-shaped rotating block is disposed on the second housing fastening bracket, the second arc-shaped rotating block is mounted in the first arc-shaped groove, and the second arc-shaped rotating block is capable of sliding along a groove surface of the first arc-shaped groove. The first door plate fastening bracket is rotatably connected to the second housing fastening bracket through a virtual axis, so that structural reliability of the first door plate fastening bracket and the second housing fastening bracket can be ensured, and sizes of the first door plate fastening bracket and the second housing fastening bracket can be reduced. This facilitates a miniaturization design of the hinge mechanism. In addition, a risk of extrusion or pulling of the flexible display may be further reduced in a process of folding the electronic device.

It may be understood that, for an inward foldable electronic device, when the first door plate fastening bracket is rotatably connected to the second housing fastening bracket through the virtual axis, an axis center at which the second housing fastening bracket rotates relative to the first door plate fastening bracket is located on a side that is of the first door plate fastening bracket and that faces the flexible display.

In addition, a second arc-shaped groove may be disposed at an end portion that is of the second door plate fastening bracket and that faces the first housing fastening bracket, a first arc-shaped rotating block is disposed on the first housing fastening bracket, the first arc-shaped rotating block is mounted in the second arc-shaped groove, and the first arc-shaped rotating block may slide along a groove surface of the second arc-shaped groove, so that the second door plate fastening bracket may be rotatably connected to the first housing fastening bracket through a virtual axis. In this way, structural reliability of the second door plate fastening bracket and the first housing fastening bracket can be ensured, and sizes of the second door plate fastening bracket and the first housing fastening bracket can be reduced. This facilitates a miniaturization design of the hinge mechanism. In addition, a risk of extrusion or pulling of the flexible display may be further reduced in a process of folding the electronic device.

It may be understood that, for an inward foldable electronic device, when the second door plate fastening bracket is rotatably connected to the first housing fastening bracket through the virtual axis, an axis center at which the first housing fastening bracket rotates relative to the second door plate fastening bracket is located on a side that is of the second door plate fastening bracket and that faces the flexible display.

It can be learned from the foregoing description that the first connecting member may be slidably connected to the main shaft, and the second connecting member may be slidably connected to the main shaft. Specifically, the main shaft is provided with a first track slot and a second track slot, the first connecting member includes a first sliding block, the first sliding block is mounted in the first track slot, and the first sliding block is capable of sliding relative to the main shaft along the first track slot, to limit a motion trajectory of the first connecting member. The second connecting member includes a second sliding block, the second sliding block is mounted in the second track slot, and the second sliding block is capable of sliding relative to the main shaft along the second track slot, to limit a motion trajectory of the second connecting member.

In addition, the first connecting member may further be rotatably connected to the main shaft, and the second connecting member may also be rotatably connected to the main shaft. During specific implementation, the main shaft is provided with a first track slot and a second track slot, the first track slot is an arc-shaped slot, the first connecting member includes a first sliding block, the first sliding block is an arc-shaped sliding block, the first sliding block is mounted in the first track slot, and the first sliding block is capable of rotating relative to the main shaft along the first track slot, to limit a motion trajectory of the first connecting member. The second track slot is an arc-shaped slot, the second connecting member includes a second sliding block, the second sliding block is an arc-shaped sliding block, the second sliding block is mounted in the second track slot, and the second sliding block is capable of rotating relative to the main shaft along the second track slot, to limit a motion trajectory of the second connecting member.

Regardless of whether the first connecting member and the second connecting member are slidably or rotatably connected to the main shaft, the first connecting member can move in the first track slot according to a specified trajectory, and the second connecting member can move in the second track slot according to a specified trajectory. Therefore, uncontrolled movement of the first connecting member and the second connecting member in an entire folding and unfolding process can be avoided, and random movement of the first housing fastening bracket and the second housing fastening bracket is further avoided, to ensure structure and motion stability of the entire hinge mechanism. In some cases, the first track slot and the second track slot are appropriately designed, so that an outer tangent line of the hinge mechanism can keep a constant length in an entire process of folding and unfolding, and a length of the flexible display covering a surface of the hinge mechanism can basically keep unchanged. In this way, extrusion or pulling of the flexible display can be effectively avoided, which improves structural reliability of the flexible display and further improves structural reliability of the electronic device.

When the first sliding block is an arc-shaped sliding block, the first connecting member may include two first sliding blocks, and the two first sliding blocks are respectively disposed at two end portions of the first connecting member in an axial direction of the hinge mechanism. The two first sliding blocks may be separately mounted in one first track slot, to implement rotation of the first connecting member relative to the main shaft. This can help improve reliability of a rotating connection between the first connecting member and the main shaft. In addition, in this application, specific forms of the two first sliding blocks of the first connecting member may be the same or may be different, provided that axis centers at which the two first sliding blocks rotate relative to the main shaft coincide. This can improve stability of rotation of the first connecting member around the main shaft.

When the second sliding block is an arc-shaped sliding block, the second connecting member includes two second sliding blocks, and the two second sliding blocks are respectively disposed at two end portions of the second connecting member in the axial direction of the hinge mechanism. The two second sliding blocks may be separately mounted in one second track slot, to implement rotation of the second connecting member relative to the main shaft. This can help improve reliability of a rotating connection between the second connecting member and the main shaft. In addition, in this application, specific forms of the two second sliding blocks of the second connecting member may be the same or may be different, provided that axis centers at which the two second sliding blocks rotate relative to the main shaft coincide. This can improve stability of rotation of the second connecting member around the main shaft.

In a possible implementation of this application, the hinge mechanism includes a plurality of rotating modules, the first door plate is fastened to each first door plate fastening bracket, and the second door plate is fastened to each second door plate fastening bracket. This can help improve integrity of a bearing surface provided by the hinge mechanism for the flexible display, and facilitates smooth support for the flexible display.

In a possible implementation of this application, the hinge mechanism further includes a synchronization component, the synchronization component includes a synchronization gear, and the synchronization gear is located between the first connecting member and the second connecting member in the axial direction of the hinge mechanism. In addition, a first gear surface is disposed at an end portion that is of the first connecting member and that faces the synchronization gear, a second gear surface is disposed at an end portion that is of the second connecting member and that faces the synchronization gear, the first gear surface is engaged with a gear surface of the synchronization gear, and the second gear surface is engaged with the gear surface of the synchronization gear. In this way, in a process of the electronic device from an unfolded state to a folded state, or from a folded state to an unfolded state, synchronous reverse movement of the first housing fastening bracket and the second housing fastening bracket can be implemented, which helps improve motion stability of the hinge mechanism, and can effectively reduce a risk of instantaneous extrusion or pulling stress on the flexible display of the electronic device, to improve structural reliability of the flexible display. In addition, the synchronization component provided in this application has a simple structure, and occupies small space in the hinge mechanism. This facilitates implementation of a miniaturization design of the hinge mechanism.

In a possible implementation of this application, the first connecting member includes the two first sliding blocks, the two first sliding blocks are respectively disposed at the two end portions of the first connecting member in the axial direction of the hinge mechanism, a first track slot corresponding to each first sliding block is disposed on the main shaft, each first sliding block is mounted in the corresponding first track slot, and each first sliding block is capable of sliding or rotating relative to the main shaft along the corresponding first track slot. This can help improve reliability of a rotating connection between the first connecting member and the main shaft. In addition, the first gear surface may be disposed on the first sliding block facing the synchronization gear, which helps improve an integrated design of the hinge mechanism, and helps reduce a size of the hinge mechanism.

Similarly, the second connecting member includes the two second sliding blocks, the two second sliding blocks are respectively disposed at the two end portions of the second connecting member in the axial direction of the hinge mechanism, a second track slot corresponding to each second sliding block is disposed on the main shaft, each second sliding block is mounted in the corresponding second track slot, and the second sliding block is capable of sliding or rotating relative to the main shaft along the second track slot. This can help improve reliability of a rotating connection between the second connecting member and the main shaft. In addition, the second gear surface may be disposed on the second sliding block facing the synchronization gear, which helps improve an integrated design of the hinge mechanism, and helps reduce a size of the hinge mechanism.

In a possible implementation of this application, the hinge mechanism further includes a damping module, and the damping module includes a first swing rod component, a second swing rod component, an elastic component, and a first conjoined cam. In the axial direction of the hinge mechanism, the first swing rod component is located between the elastic component and the first conjoined cam, and the second swing rod component is located between the elastic component and the first conjoined cam. The first swing rod component may include a first swing rod, a second swing rod, and a first guide rod. The first swing rod and the second swing rod are rotatably connected to the main shaft, and the first swing rod and the second swing rod are connected through the first guide rod. A third track slot is disposed on the first housing fastening bracket, the first guide rod is inserted into the third track slot, and the first guide rod is capable of sliding along the third track slot. The second swing rod component may include a third swing rod, a fourth swing rod, and a second guide rod. The third swing rod and the fourth swing rod are rotatably connected to the main shaft, and the third swing rod and the fourth swing rod are connected through the second guide rod. A fourth track slot is disposed on the second housing fastening bracket, the second guide rod is inserted into the fourth track slot, and the second guide rod is capable of sliding along the fourth track slot. In addition, a first cam surface is disposed on an end surface that is of the first swing rod and that faces the first conjoined cam, a third cam surface is disposed on an end surface that is of the third swing rod and that faces the first conjoined cam, and the first conjoined cam includes a fifth cam surface disposed toward the first swing rod and a sixth cam surface disposed toward the third swing rod. In the axial direction of the hinge mechanism, under action of an elastic force of the elastic component, the first cam surface abuts against the fifth cam surface, and the third cam surface abuts against the sixth cam surface. In this way, in a process in which the first housing fastening bracket and the second housing fastening bracket rotate relative to the hinge mechanism, a corresponding damping force may be generated when oblique surfaces of two cam surfaces that abut against each other are in contact. Existence of the damping force may implement a self-unfolding function of the electronic device at an end stage of an unfolded state and a self-folding function of the electronic device at an end stage of a folded state, and under action of the damping force, a user can have an obvious jerk sense in a process of opening and closing the electronic device, to improve user experience.

In addition, the damping module may further include a second conjoined cam. The first swing rod component is located between the first conjoined cam and the second conjoined cam, and the second swing rod component is located between the first conjoined cam and the second conjoined cam. A second cam surface is disposed on an end surface that is of the second swing rod and that faces the second conjoined cam, and a fourth cam surface is disposed on an end surface that is of the fourth swing rod and that faces the second conjoined cam. The second conjoined cam includes a seventh cam surface disposed toward the second swing rod and an eighth cam surface disposed toward the fourth swing rod. In the axial direction of the hinge mechanism, under the action of the elastic force of the elastic component, the second cam surface abuts against the seventh cam surface, and the fourth cam surface abuts against the eighth cam surface. In this way, the hinge mechanism may provide a greater damping force, to improve stability of the electronic device in which the hinge mechanism is used in an unfolded state, a folded state, or an intermediate state. In addition, a tactile feeling of the user in a process of opening and closing the electronic device may be further effectively improved, to improve user experience.

To rotatably connect the damping module to the main shaft, in a possible implementation of this application, the main shaft further includes a first mounting portion and a second mounting portion. In the axial direction of the hinge mechanism, the first mounting portion is located between the first swing rod and the second swing rod, and the first swing rod and the second swing rod are rotatably connected to the first mounting portion through a first shaft. In the axial direction of the hinge mechanism, the second mounting portion is located between the third swing rod and the fourth swing rod, and the third swing rod and the fourth swing rod are rotatably connected to the second mounting portion through a second shaft.

In addition, the damping module further includes a plurality of gaskets. At least one gasket is located between the first swing rod and the second swing rod. In the axial direction of the hinge mechanism, under the action of the elastic force of the elastic component, the first swing rod and the second swing rod press the at least one gasket located between the first swing rod and the second swing rod toward the first mounting portion. In addition, at least one gasket is located between the third swing rod and the fourth swing rod. In the axial direction of the hinge mechanism, under the action of the elastic force of the elastic component, the third swing rod and the fourth swing rod press the at least one gasket located between the third swing rod and the fourth swing rod toward the second mounting portion. In a process in which the first swing rod component and the second swing rod component rotate around the main shaft, relative rotation can occur between the swing rod and the gasket that are in contact, to generate frictional resistance. The frictional resistance may be used as a damping force that prevents the first swing rod component and the second swing rod component from rotating relative to the main shaft, to increase a damping force provided by the damping module.

In a possible implementation of this application, in the axial direction of the hinge mechanism, a first slot is disposed on at least one side surface of the first mounting portion, the at least one gasket located between the first swing rod and the second swing rod is clamped into the first slot. In a direction in which the first swing rod component rotates relative to the main shaft, the at least one gasket located between the first swing rod and the second swing rod is relatively fastened to the first mounting portion. In the axial direction of the hinge mechanism, a second slot is disposed on at least one side surface of the second mounting portion, the at least one gasket located between the third swing rod and the fourth swing rod is clamped into the second slot. In a direction in which the second swing rod component rotates relative to the main shaft, the at least one gasket located between the third swing rod and the fourth swing rod is relatively fastened to the second mounting portion. In this way, the gasket can be prevented from rotating with the swing rod relative to the main shaft, so that stable friction can be generated between the swing rod and the gasket, to improve stability of the damping force provided by the damping module.

In this application, in addition to the foregoing design manner, in a possible implementation, the damping module further includes a plurality of gaskets, each gasket is sleeved on the first shaft and the second shaft, and at least a part of at least one gasket is located between the first swing rod and the second swing rod. In the axial direction of the hinge mechanism, under the action of the elastic force of the elastic component, the first swing rod and the second swing rod press the at least a part of at least one gasket located between the first swing rod and the second swing rod toward the first mounting portion. In addition, at least a part of the at least one gasket is located between the third swing rod and the fourth swing rod. In the axial direction of the hinge mechanism, under the action of the elastic force of the elastic component, the third swing rod and the fourth swing rod press the at least a part of the at least one gasket located between the third swing rod and the second mounting portion toward the second mounting portion. In this way, rotation of each gasket relative to the first mounting portion and the second mounting portion may be limited by using the first shaft and the second shaft that are disposed in parallel, so that stable friction can be generated between the swing rod and the gasket, to improve stability of the damping force provided by the damping module.

According to a second aspect, this application further provides an electronic device. The electronic device includes a first housing, a second housing, a flexible display, and the hinge mechanism in the first aspect. The first housing and the second housing are respectively disposed on two opposite sides of the hinge mechanism, the first housing fastening bracket is fastened to the first housing, and the second housing fastening bracket is fastened to the second housing. The flexible display continuously covers the first housing, the second housing, and the hinge mechanism, and the flexible display is fastened to the first housing and the second housing. When the electronic device is in an unfolded state, the hinge mechanism, the first housing, and the second housing jointly provide flat support for the flexible display, to ensure that a form of the electronic device in the unfolded state is complete. In a process of the electronic device from an unfolded state to a folded state, the two housings rotate toward each other to drive the flexible display to rotate. This can effectively avoid deformation of the flexible display, to reduce a risk of damage to the flexible display.

REFERENCE NUMERALS

Figures 1, 2:
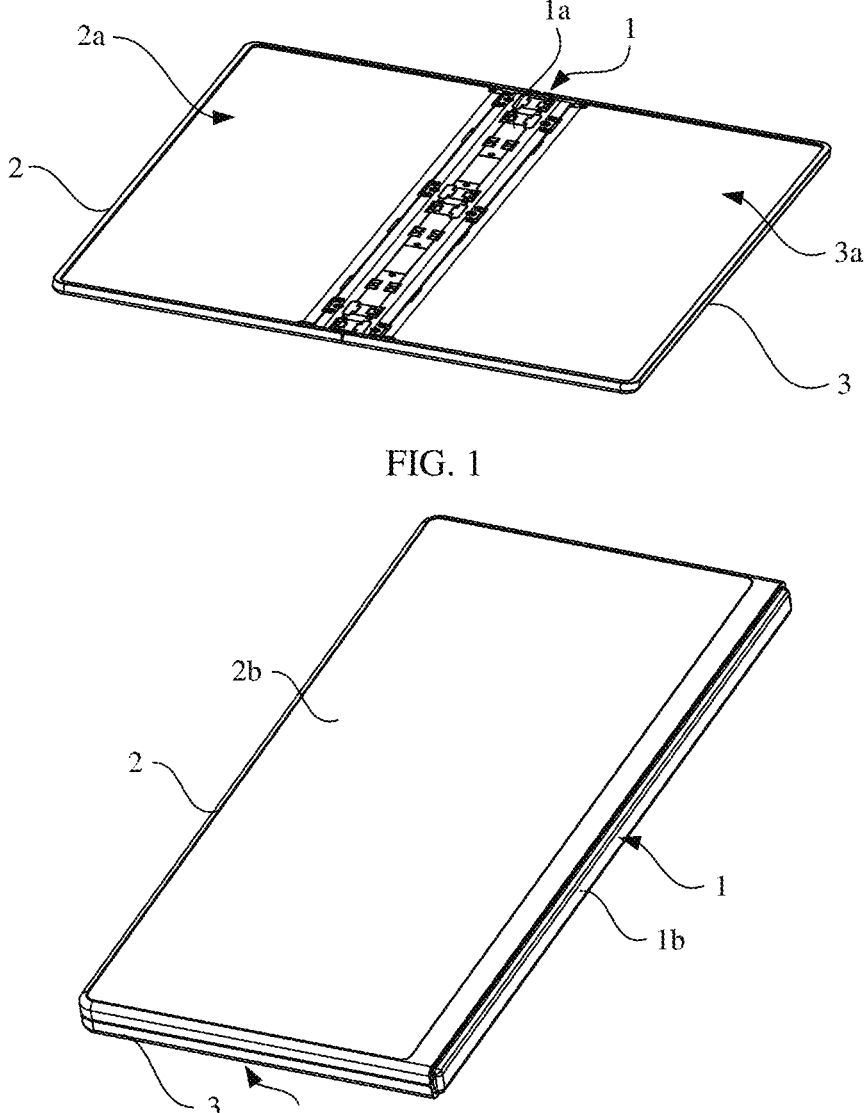
FIG. 1 is a diagram of a structure of an electronic device in an unfolded state according to an embodiment of this application.
FIG. 2 is a diagram of a structure of an electronic device in a folded state according to an embodiment of this application.

1—hinge mechanism; 1*a*—bearing surface; 1*b*—third appearance surface; 101—rotating module; 1011—first rotating component;
10111—first support arm; 101111—first avoidance opening; 101112—first guiding portion; 10112—first door plate fastening bracket;
101121—first protruding portion; 101122—first arc-shaped groove; 10113—first connecting member; 101131—first sliding block;
101132—second bearing sub-surface; 101133—second avoidance opening; 101134—third avoidance opening; 101135—first gear surface;
10114—first connecting rod; 10115—first rotating shaft; 10116—second rotating shaft; 10117—third rotating shaft; 10118—fourth rotating shaft;
1012—second rotating component; 10121—second support arm; 101211—second guiding portion; 10122—second door plate fastening bracket;
101221—second arc-shaped groove; 10123—second connecting member; 101231—second sliding block; 101232—third bearing sub-surface;
101233—second gear surface; 10124—second connecting rod;
1013—first housing fastening bracket; 10131—first sliding groove; 101311—first slide rail; 10132—first arc-shaped rotating block;
10133—third track slot;
1014—second housing fastening bracket; 10141—second sliding groove; 101411—second slide rail; 10142—second arc-shaped rotating block;
10143—fourth track slot;
102—main shaft; 1021—first track slot; 1022—first mounting groove; 1023—second track slot; 1024—second mounting groove;
1025—first bearing sub-surface; 1026—first mounting portion; 10261—first slot; 10262—first mounting hole; 102621—first opening; 1027—second mounting portion; 10271—second slot; 10272—second mounting hole; 102721—second opening;
103—rotating shaft back cover; 104—first door plate; 1041—first plate surface; 105—second door plate; 1051—second plate surface;
106—connecting beam; 107—synchronization component; 1071—synchronization gear;
108—damping module; 1081—first swing rod component; 10811—first swing rod; 108111—first cam surface;
10812—second swing rod; 108121—second cam surface; 10813—first guide rod; 1082—second swing rod component;
10821—third swing rod; 108211—third cam surface; 10822—fourth swing rod; 108221—fourth cam surface;
10823—second guide rod; 1083—first shaft; 1084—second shaft; 1085—gasket; 1086—elastic component;
1087—first conjoined cam; 10871—fifth cam surface; 10872—sixth cam surface; 1088—second conjoined cam;
10881—seventh cam surface; 10882—eighth cam surface; 1089—first limiting piece; 10810—second limiting piece;

2—first housing; 2*a*—first support surface; 2*b*—first appearance surface; 201—first accommodating groove;
3—second housing; 3*a*—second support surface; 3*b*—second appearance surface; 301—second accommodating groove; and
4—flexible display.

DETAILED DESCRIPTION OF ILLUSTRATIVE EMBODIMENTS

To make objectives, technical solutions, and advantages of this application clearer, the following further describes this application in detail with reference to the accompanying drawings. Terms used in the following embodiments of this application are merely intended to describe specific embodiments, but are not intended to limit this application. Terms "one", "a", and "this" of singular forms used in this specification and the appended claims of this application are also intended to include expressions such as "one or more", unless otherwise specified in the context clearly.

Reference to "an embodiment", "some embodiments", or the like described in this specification indicates that one or more embodiments of this application include specific features, structures, or characteristics described with reference to the embodiments. Therefore, statements such as "in an embodiment", "in some embodiments", "in some other embodiments", and "in other embodiments" that appear at different places in this specification do not necessarily refer to a same embodiment. Instead, the statements mean "one or more but not all of embodiments", unless otherwise specifically emphasized in another manner. Terms "include", "contain", "have", and variants thereof all mean "including, but not limited to", unless otherwise specifically emphasized in another manner.

For ease of understanding of a hinge mechanism provided in embodiments of this application, the following first describes an application scenario of the hinge mechanism. The hinge mechanism may be but is not limited to being used in a foldable electronic device like a mobile phone, a palmtop computer (personal digital assistant, PDA), a notebook computer, or a tablet computer. When the hinge mechanism provided in embodiments of this application is used in an electronic device, refer to FIG. 1. FIG. 1 is a diagram of a structure of the electronic device in an unfolded state according to an embodiment of this application. In addition to a hinge mechanism 1, the electronic device may further include two housings and a flexible display (not shown in FIG. 1). For ease of description, the two housings may be respectively named a first housing 2 and a second housing 3. The first housing 2 and the second housing 3 are located on two opposite sides of the hinge mechanism 1, and can rotate around the hinge mechanism 1 separately. When the electronic device is used, the electronic device may be folded and unfolded in different use scenarios.

FIG. 1 shows structures of a first surface of the hinge mechanism 1, a first surface of the first housing 2, and a first surface of the second housing 3. In the unfolded state, the first surface of the hinge mechanism 1, the first surface of the first housing 2, and the first surface of the second housing 3 may be connected to form a flat support surface. The first surface of the hinge mechanism 1 is a surface that is of the hinge mechanism 1 and that faces the flexible display, the first surface of the first housing 2 is a surface that is of the first housing 2 and that faces the flexible display, and the first surface of the second housing 3 is a surface that is of the second housing 3 and that faces the flexible display. For ease of description, in this application, the first surface of the hinge mechanism 1 may be defined as a bearing surface 1*a* of the hinge mechanism 1, the first surface of the first housing 2 may be defined as a first support surface 2*a*, and the first surface of the second housing 3 may be defined as a second support surface 3*a*.

Based on this, the flexible display may continuously cover the bearing surface 1*a* of the hinge mechanism 1, the first support surface 2*a* of the first housing 2, and the second support surface 3*a* of the second housing 3. The hinge mechanism 1 is disposed opposite to a foldable portion of the flexible display. In addition, the flexible display may be fastened to the first support surface 2*a* of the first housing 2 and the second support surface 3*a* of the second housing 3, and a connection manner may be but is not limited to bonding. In this way, when the electronic device is in the unfolded state shown in FIG. 1, the hinge mechanism 1, the first housing 2, and the second housing 3 may flatly support the flexible display.

In this application, the electronic device may be an inward foldable electronic device. When the inward foldable electronic device is in a folded state, the flexible display is located on an inner side of the electronic device. FIG. 2 shows a relative position relationship between the hinge mechanism 1 and the two housings when the electronic device is in the folded state. FIG. 2 shows structures of a second surface of the hinge mechanism 1, a second surface of the first housing 2, and a second surface of the second housing 3. The second surface of the hinge mechanism 1 is a surface that is of the hinge mechanism 1 and that is away from the flexible display, the second surface of the first housing 2 is a surface that is of the first housing 2 and that is away from the flexible display, and the second surface of the second housing 3 is a surface that is of the second housing 3 and that is away from the flexible display. In this case, the first surface and the second surface of the hinge mechanism 1 are disposed opposite to each other, the first surface and the second surface of the first housing 2 are disposed opposite to each other, and the first surface and the second surface of the second housing 3 are disposed opposite to each other. In this application, the second surface of the hinge mechanism 1, the second surface of the first housing 2, and the second surface of the second housing 3 may be used as appearance surfaces of the electronic device. For ease of description, the second surface of the first housing 2 may be defined as a first appearance surface 2*b*, the second surface of the second housing 3 may be defined as a second appearance surface 3*b*, and the second surface of the hinge mechanism 1 may be defined as a third appearance surface 1*b*. It may be understood that an appearance surface of the inward foldable electronic device is exposed to an outer side of the electronic device when the electronic device is in the unfolded state and the folded state.

In this application, in a process in which the first housing 2 and the second housing 3 rotate relative to each other from the unfolded state shown in FIG. 1 to the folded state shown in FIG. 2 or from the folded state shown in FIG. 2 to the unfolded state shown in FIG. 1, the flexible display may be bent or flattened with the first housing 2 and the second housing 3. In addition, it may be understood that a process of the electronic device from the unfolded state shown in FIG. 1 to the folded state shown in FIG. 2 or from the folded state shown in FIG. 2 to the unfolded state shown in FIG. 1 is a process in which the first housing 2 and the second housing 3 rotate around the hinge mechanism 1. As a key functional component in the foldable electronic device, the hinge mechanism 1 may be disposed opposite to the foldable portion of the flexible display. Therefore, the hinge mechanism 1 supports the foldable portion of the flexible display in the unfolded state shown in FIG. 1 and accommodates the foldable portion of the flexible display in the folded state shown in FIG. 2.

When the hinge mechanism is specifically disposed, to implement a rotation function of the hinge mechanism, and avoid extrusion or pulling of the flexible display in a process of folding the electronic device, a moving component of the hinge mechanism may generally include a plurality of interconnected connecting members, so that the moving component moves according to a specified trajectory through mutual pull motion between the connecting members. However, as a size of the hinge mechanism continuously decreases, when the electronic device is in the folded state, it is increasingly difficult for screen accommodation space formed by the hinge mechanism to meet a bending requirement of the foldable portion of the flexible display, which easily causes extrusion of the flexible display. As a result, it is difficult to ensure structural strength of the flexible display. In addition, a decrease in the size of the hinge mechanism may also easily cause insufficient structural strength of the moving component, affecting structural reliability of the hinge mechanism.

The hinge mechanism provided in this application is intended to resolve the foregoing problem, to improve structural strength of the hinge mechanism while meeting a design requirement of miniaturization of the hinge mechanism by optimizing design of a rotating module that is in the hinge mechanism and that is configured to implement a rotation function. In addition, a motion trajectory of the rotating module that is in the hinge mechanism and that is configured to implement a rotation function is appropriately designed, so that when the electronic device is in the folded state, the screen accommodation space formed by the hinge mechanism can meet the bending requirement of the foldable portion of the flexible display, to avoid extrusion of the flexible display. This improves structural reliability of the flexible display and prolongs a service life of the flexible display. To facilitate understanding of the hinge mechanism provided in embodiments of this application, the following describes a specific structure of the hinge mechanism in detail with reference to the accompanying drawings.

Figures 3, 4:
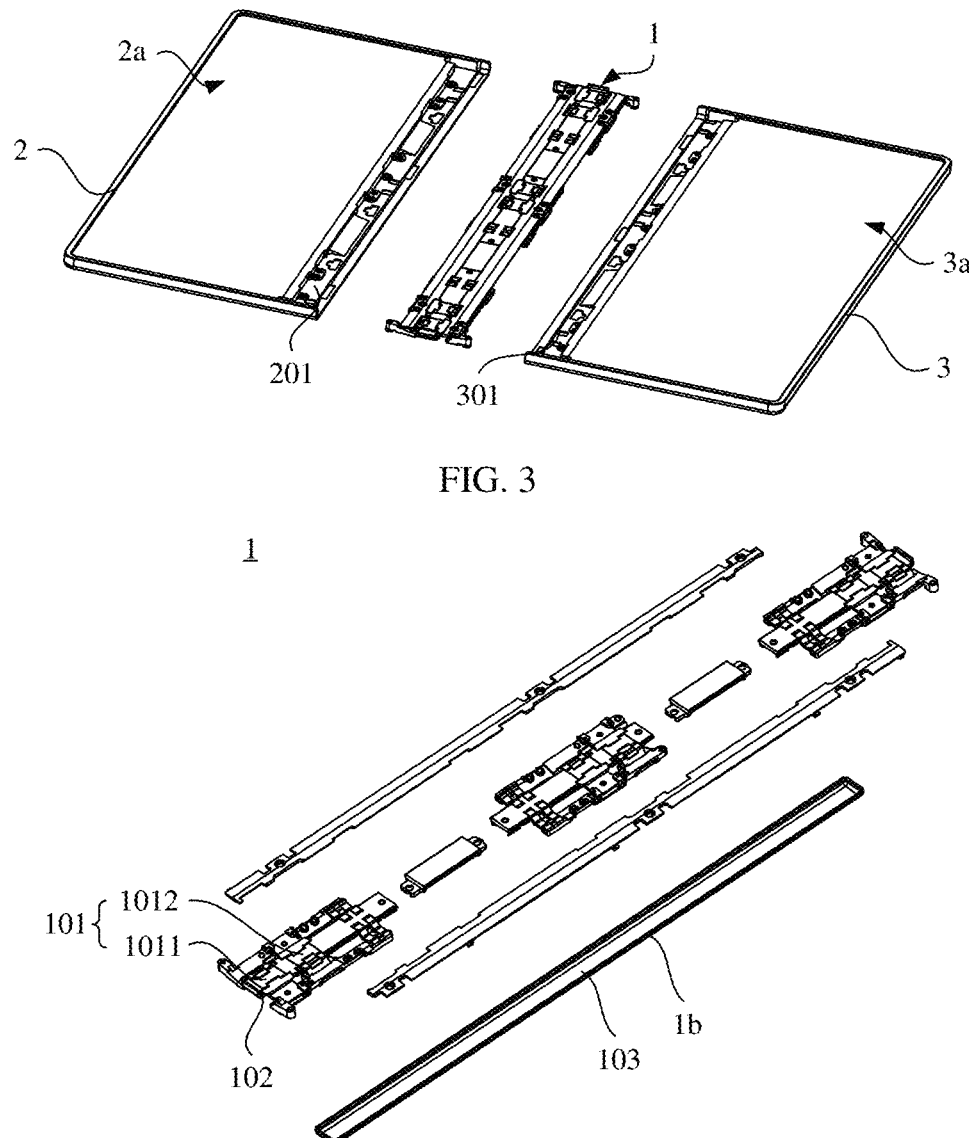
FIG. 3 is an exploded view of the electronic device shown in FIG. 1.
FIG. 4 is an exploded view of a hinge mechanism according to an embodiment of this application.

FIG. 3 is an exploded view of the electronic device shown in FIG. 1. A first accommodating groove 201 may be disposed at an end portion that is of the first housing 2 and that faces the hinge mechanism 1, and a second accommodating groove 301 may be disposed at an end portion that is of the second housing 3 and that faces the hinge mechanism 1. At least a part of the hinge mechanism 1 is accommodated in the first accommodating groove 201 and connected to the first housing 2, and at least a part of the hinge mechanism 1 is accommodated in the second accommodating groove 301 and connected to the second housing 3. In this way, the first housing 2 and the second housing 3 move in a direction facing each other or opposite to each other through rotation of the hinge mechanism 1. This implements a folding function of the electronic device.

In this application, to implement a rotation function of the hinge mechanism 1, the hinge mechanism 1 may include a rotating module 101. FIG. 4 is an exploded view of the hinge mechanism according to an embodiment of this application. A quantity of rotating modules 101 in the hinge mechanism 1 is not limited in this application. The hinge mechanism 1 may include only one rotating module 101, or may include a plurality of rotating modules 101. The hinge mechanism 1 shown in FIG. 4 includes three rotating modules 101, and the three rotating modules 101 may be arranged at intervals in an axial direction of the hinge mechanism 1. In this application, the axial direction of the hinge mechanism 1 is an extension direction of an axis along which the first housing 2 and the second housing 3 shown in FIG. 1 rotate around the hinge mechanism 1. It may be understood that, in this application, the plurality of rotating modules 101 are disposed in the hinge mechanism 1, so that the first housing 2 and the second housing 3 are rotatably connected through the plurality of rotating modules 101. This can effectively improve stability of rotation of the first housing 2 and the second housing 3 of the electronic device relative to the hinge mechanism 1.

Still refer to FIG. 4. The hinge mechanism 1 may further include a main shaft 102 and a rotating shaft back cover 103. The rotating shaft back cover 103 is located on a side that is of the main shaft 102 and that is away from the flexible display. In addition, the rotating shaft back cover 103 is fastened to the main shaft 102, and a connection manner may be but is not limited to welding, threaded connection, or the like. The rotating shaft back cover 103 may be used as an appearance member of the hinge mechanism 1, and may protect each component in the hinge mechanism 1. In addition, it may be understood that an appearance surface of the rotating shaft back cover 103 may be used as the third appearance surface 1b of the hinge mechanism 1.

Figure 5:
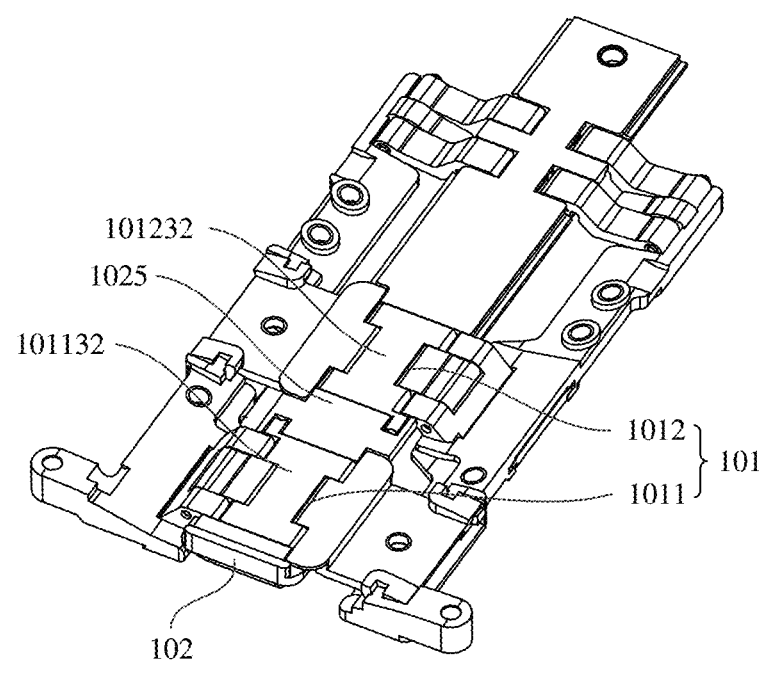
FIG. 5 is a diagram of a partial structure of a hinge mechanism according to an embodiment of this application.

For ease of understanding of a structure of the rotating module 101, refer to FIG. 5. FIG. 5 is a diagram of a partial structure of the hinge mechanism 1 according to an embodiment of this application, to show a manner of disposing the rotating module 101 in the hinge mechanism 1. In this application, the rotating module 101 may include a first rotating component 1011 and a second rotating component 1012. In addition, as shown in FIG. 5, the main shaft 102 may be used as a bearing portion of the first rotating component 1011 and the second rotating component 1012.

It should be noted that, in this embodiment of this application, as shown in FIG. 4, when there are a plurality of rotating modules 101, the hinge mechanism 1 may be separately provided with one main shaft 102 corresponding to each rotating module 101, so that the first rotating component 1011 and the second rotating component 1012 of each rotating module 101 use the corresponding main shaft 102 as a bearing portion, and the rotating modules 101 are more flexibly disposed. In some other possible embodiments of this application, when there are a plurality of rotating modules 101, the first rotating components 1011 and the second rotating components 1012 of the plurality of rotating modules 101 may use a same main shaft 102 as a bearing portion, to improve integration of the hinge mechanism 1, thereby improving structural reliability of the hinge mechanism 1.

Figure 6:
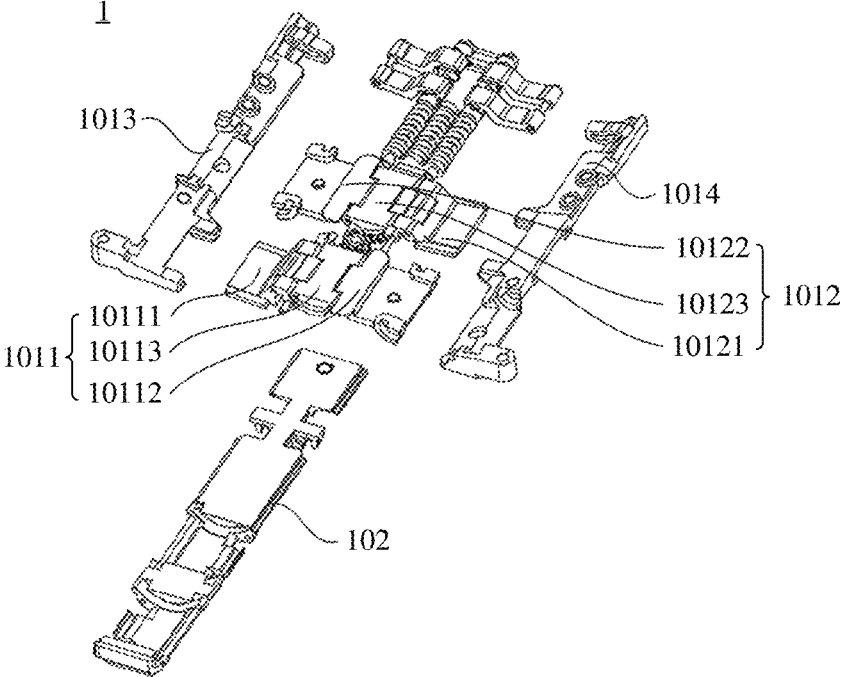
FIG. 6 is an exploded view of the structure shown in FIG. 5.

FIG. 6 is an exploded view of the structure shown in FIG. 5. In this application, the first rotating component 1011 may include a first support arm 10111, a first door plate fastening bracket 10112, and a first connecting member 10113. The first connecting member 10113 is located between the first support arm 10111 and the first door plate fastening bracket 10112, the first connecting member 10113 is rotatably connected to the first support arm 10111, and the first connecting member 10113 is rotatably connected to the first door plate fastening bracket 10112, so that the first support arm 10111 and the first door plate fastening bracket 10112 are mutually pulled through the first connecting member 10113. Based on this, it may be understood that a motion trajectory of the first connecting member 10113 plays a key role in a motion trajectory of the first rotating component 1011.

Figure 7:
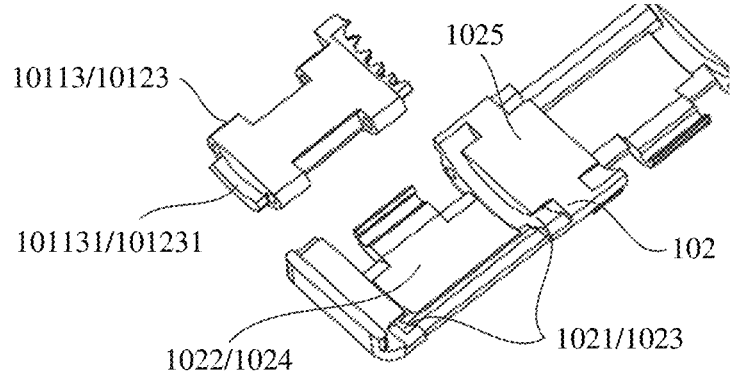
FIG. 7 is a diagram of a matching relationship between a first connecting member and a main shaft according to an embodiment of this application.

In this application, the first connecting member 10113 may move relative to the main shaft 102. During specific implementation, refer to FIG. 7. FIG. 7 is a diagram of a matching relationship between the first connecting member 10113 and the main shaft 102 according to an embodiment of this application. A first track slot 1021 is disposed on the main shaft 102, and the first connecting member 10113 can move relative to the main shaft 102 along the first track slot 1021, to limit a motion trajectory of the first connecting member 10113. In this application, to implement movement of the first connecting member 10113 along the first track slot 1021, the first connecting member 10113 may include a first sliding block 101131. The first sliding block 101131 may be mounted in the first track slot 1021 and can move along the first track slot 1021. In this way, the first track slot 1021 limits the motion trajectory of the first connecting member 10113, so that a position of the first connecting member 10113 is stable and no virtual position shaking occurs in a process of an unfolded state and a folded state of the hinge mechanism 1. This improves reliability of the hinge mechanism 1 in the foregoing two states.

In this application, a form of the first track slot 1021 is not specifically limited. For example, the first track slot 1021 may be an arc-shaped slot shown in FIG. 7, and the arc-shaped slot may be a circle arc-shaped slot, an elliptical arc-shaped slot, or an arc-shaped slot of another possible form. The first sliding block 101131 may be an arc-shaped sliding block, and the arc-shaped sliding block may be a circle arc-shaped sliding block, an elliptical arc-shaped sliding block, or an arc-shaped sliding block of another possible form. In this case, the first sliding block 101131 can rotate relative to the main shaft 102 along the first track slot 1021. This implements a rotating connection between the first connecting member 10113 and the main shaft 102, to limit a motion trajectory of the first connecting member 10113.

In some other possible embodiments of this application, the first sliding block 101131 can alternatively slide relative to the main shaft 102 along the first track slot 1021. This implements a sliding connection between the first connecting member 10113 and the main shaft 102, to limit a motion trajectory of the first connecting member 10113. During specific implementation, the first track slot 1021 may alternatively be a straight-line slot, and the first sliding block 101131 may be adaptively disposed as a straight-line sliding block. It may be understood that, in this application, a shape of the first sliding block 101131 matches a shape of the first track slot 1021, to improve smoothness of sliding of the first sliding block 101131 along the first track slot 1021.

Still refer to FIG. 7. The main shaft 102 may be further provided with a first mounting groove 1022, and the first connecting member 10113 is mounted in the first mounting groove 1022. In this way, a structure of the hinge mechanism 1 may be compact, to facilitate a miniaturization design of the hinge mechanism 1. The first track slot 1021 may be disposed on a groove wall that is of the first mounting groove 1022 and that is disposed in an axial direction of the hinge mechanism 1, and the first sliding block 101131 may be disposed at an end portion of the first connecting member 10113 in the axial direction of the hinge mechanism 1.

Refer to FIG. 5 and FIG. 7 together. The main shaft 102 includes a first bearing sub-surface 1025, and the first bearing sub-surface 1025 is disposed facing the flexible display. In addition, the first connecting member 10113 may include a second bearing sub-surface 101132. When an electronic device is in an unfolded state, the first bearing sub-surface 1025 and the second bearing sub-surface 101132 may be jointly configured to flatly support the flexible display. This helps improve reliability of supporting the flexible display by the hinge mechanism 1 when the electronic device is in the unfolded state.

It should be noted that, in a possible embodiment of this application, the entire first connecting member 10113 may be used as the first sliding block 101131. In this case, the first track slot 1021 may be correspondingly adjusted, so that the entire first connecting member 10113 may be mounted in the first track slot 1021, and rotate or slide relative to the main shaft 102 along the first track slot 1021.

Figure 8:
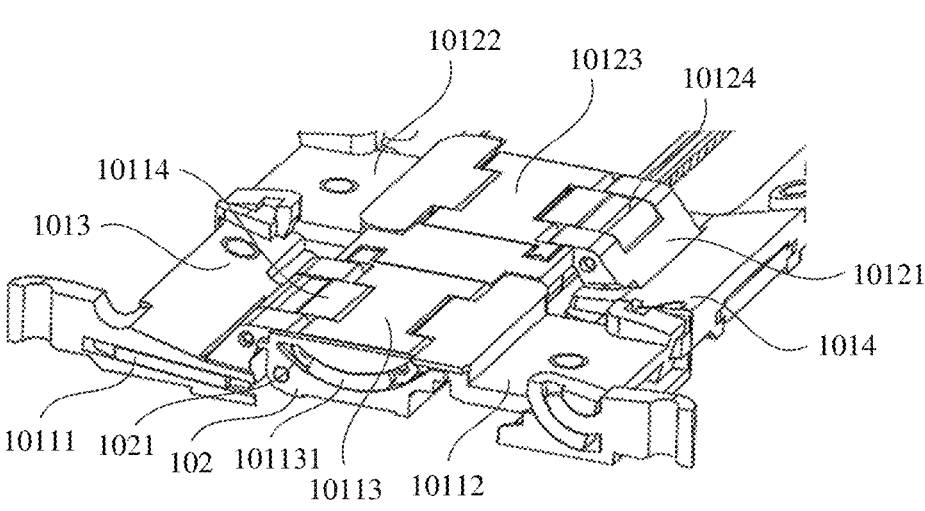
FIG. 8 is a sectional view of a first connecting member of a hinge mechanism in a case in which an electronic device is in an unfolded state according to an embodiment of this application.
Figure 9:
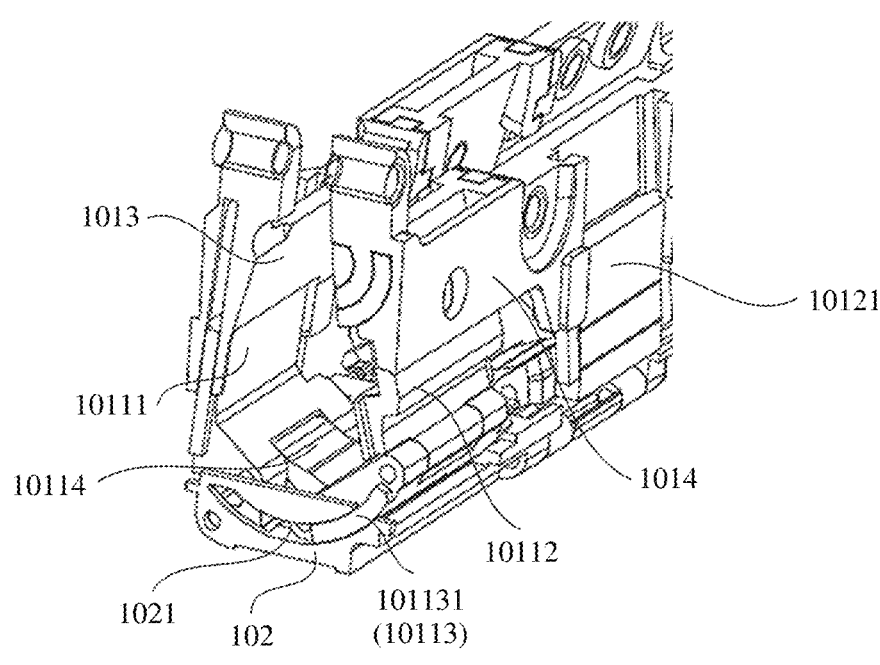
FIG. 9 is a sectional view of a first connecting member of a hinge mechanism in a case in which an electronic device is in a folded state according to an embodiment of this application.

FIG. 8 is a sectional view of the first connecting member 10113 of the hinge mechanism 1 in a case in which an electronic device is in an unfolded state according to an embodiment of this application. The sectional view may be used to show a matching relationship between the first sliding block 101131 of the first connecting member 10113 and the first track slot 1021. In addition, FIG. 9 is a sectional view of the first connecting member 10113 of the hinge mechanism 1 in a case in which an electronic device is in a folded state according to an embodiment of this application. It can be learned from FIG. 8 and FIG. 9 that, in a process of the electronic device from the unfolded state to the folded state, the first sliding block 101131 of the first connecting member 10113 may move in the first track slot 1021 in a direction facing the first door plate fastening bracket 10112. In a process of the electronic device from the folded state to the unfolded state, the first sliding block 101131 of the first connecting member 10113 may move in the first track slot 1021 in a direction facing the first support arm 10111. Therefore, the first connecting member 10113 can move relative to the main shaft 102 according to a specified trajectory.

It can be learned from FIG. 8 and FIG. 9 that, in a process of the electronic device from the unfolded state to the folded state or from the folded state to the unfolded state, the first support arm 10111 and the first door plate fastening bracket 10112 are mutually pulled through the first connecting member 10113, so that the first support arm 10111 and the first door plate fastening bracket 10112 rotate around the main shaft 102.

Figure 10:
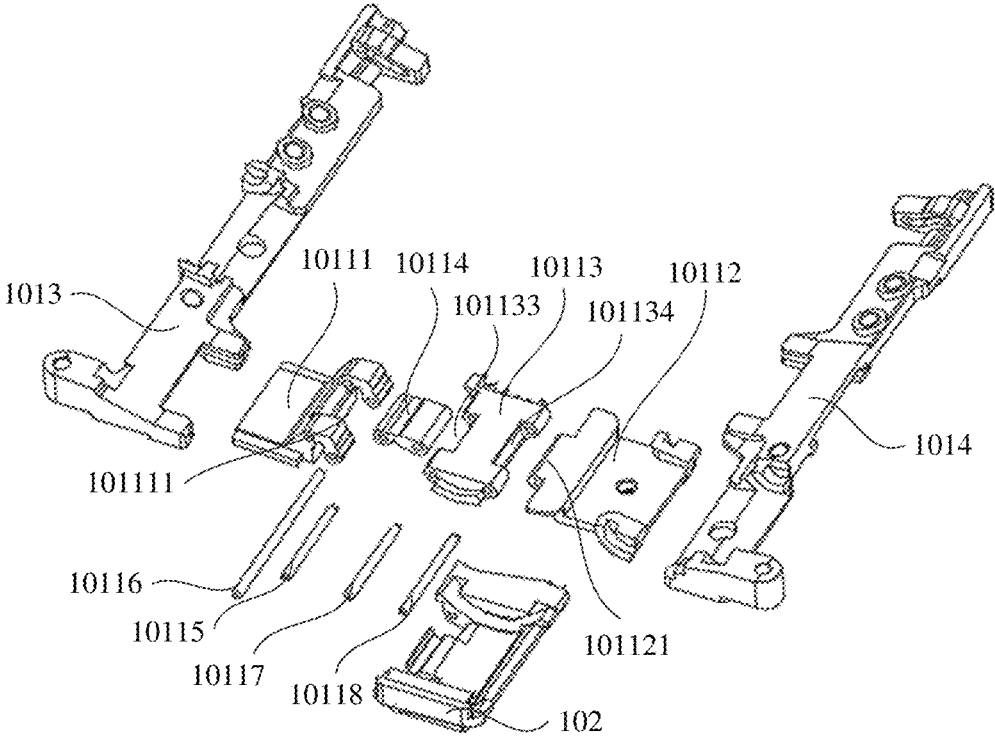
FIG. 10 is an exploded view of a partial structure of a hinge mechanism according to an embodiment of this application.

In this application, specifically, when the first support arm 10111 is rotatably connected to the first connecting member 10113, refer to FIG. 10. FIG. 10 is an exploded view of a partial structure of the hinge mechanism 1 according to an embodiment of this application. The exploded view may be used to show relative position relationships among the first support arm 10111, the first connecting member 10113, and the first door plate fastening bracket 10112. As shown in FIG. 10, the first rotating component 1011 may further include a first connecting rod 10114. The first connecting rod 10114 is located between the first support arm 10111 and the first connecting member 10113, the first support arm 10111 is rotatably connected to the first connecting rod 10114, the first connecting member 10113 is rotatably connected to the first connecting rod 10114, and an axis along which the first support arm 10111 rotates relative to the first connecting rod 10114 is parallel to but not coincident with an axis along which the first connecting member 10113 rotates relative to the first connecting rod 10114. During specific implementation, the first connecting rod 10114 is rotatably connected to the first support arm 10111 through a first rotating shaft 10115, and an axis of the first rotating shaft 10115 extends in an axial direction of the hinge mechanism 1. In addition, refer to FIG. 6 and FIG. 10 together. The first support arm 10111 may be provided with a first avoidance opening 101111, and at least a part of the first connecting rod 10114 may be accommodated in the first avoidance opening 101111, so that a structure of the first rotating component 1011 may be compact, to help reduce a size of the hinge mechanism 1.

In addition, as shown in FIG. 10, the first support arm 10111 may be rotatably connected to the main shaft 102 through a second rotating shaft 10116. An axis of the first rotating shaft 10115 is parallel to but not coincident with an axis of the second rotating shaft 10116. Refer to both FIG. 8 and FIG. 10. The second rotating shaft 1016 is located on a side that is of the first rotating shaft 10115 and that is away from the flexible display.

Still refer to FIG. 10. The first connecting rod 10114 is rotatably connected to the first connecting member 10113 through a third rotating shaft 10117, and the axis of the first rotating shaft 10115 is parallel to but not coincident with an axis of the third rotating shaft 10117. In addition, a second avoidance opening 101133 may be disposed at an end portion that is of the first connecting member 10113 and that faces the first connecting rod 10114, and at least a part of the first connecting member 10113 may be accommodated in the second avoidance opening 101133, so that a structure of the first rotating component 1011 is compact.

In this application, the first connecting member 10113 may be rotatably connected to the first door plate fastening bracket 10112 through a fourth rotating shaft 10118, and an axis of the fourth rotating shaft 10118 is parallel to but not coincident with the axis of the third rotating shaft 10117. In addition, as shown in FIG. 10, a third avoidance opening 101134 may be disposed at an end portion that is of the first connecting member 10113 and that faces the first door plate fastening bracket 10112, a first protruding portion 101121 may be disposed at an end portion that is of the first door plate fastening bracket 10112 and that faces the first connecting member 10113, and the first protruding portion 101121 may be accommodated in the third avoidance opening 101134. In this way, the first protruding portion 101121 may be rotatably connected to the first connecting member 10113 through the fourth rotating shaft 10118 to implement a rotating connection between the first connecting member 10113 and the first door plate fastening bracket 10112, so that a structure of the first rotating component 1011 is compact.

Figure 11:
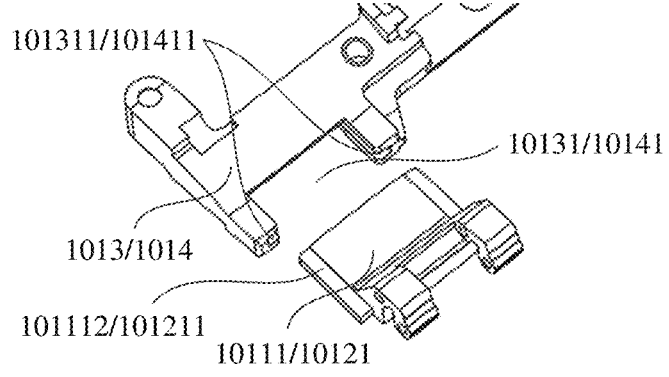
FIG. 11 is a diagram of a matching relationship between a first support arm and a first housing fastening bracket according to an embodiment of this application.

Still refer to FIG. 10. In this application, the rotating module 101 may further include a first housing fastening bracket 1013 and a second housing fastening bracket 1014. The first housing fastening bracket 1013 and the second housing fastening bracket 1014 are respectively disposed on two opposite sides of the main shaft 102. The first rotating component 1011 is located between the first housing fastening bracket 1013 and the second housing fastening bracket 1014. The first support arm 10111 is slidably connected to the first housing fastening bracket 1013. During specific implementation, refer to FIG. 11. FIG. 11 is a diagram of a matching relationship between the first support arm 10111 and the first housing fastening bracket 1013 according to an embodiment of this application. A first sliding groove 10131 is disposed on the first housing fastening bracket 1013, and the first sliding groove 10131 extends in a first direction. The first support arm 10111 may be mounted in the first sliding groove 10131, and may slide in the first sliding groove 10131 in the first direction. The first direction may be a direction in which the first housing fastening bracket 1013 moves toward or away from the main shaft 102. In addition, to prevent the first support arm 10111 from falling off from the first sliding groove 10131, a first slide rail 101311 may be disposed on a groove wall of the first sliding groove 10131, and a first guiding portion 101112 is disposed on the first support arm 10111. In this way, the first guiding portion 101112 may be clamped on the first slide rail 101311, and the first guiding portion 101112 may slide along the first slide rail 101311, to limit a position of the first support arm 10111 in the first sliding groove 10131. In addition, the first slide rail 101311 is disposed on the groove wall of the first sliding groove 10131, to provide guidance for the first support arm 10111 to slide along the first sliding groove 10131. This improves motion stability of the first support arm 10111.

Figure 12:
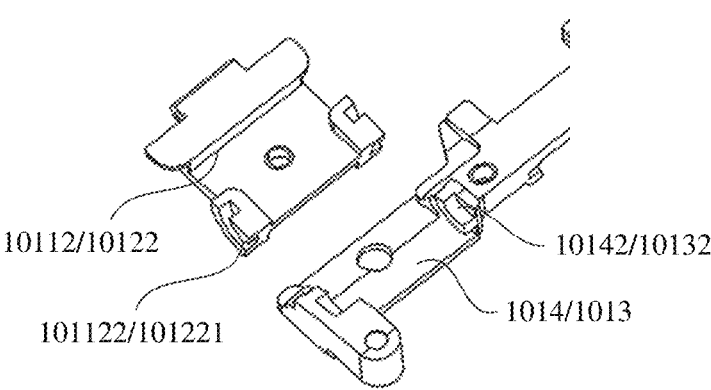
FIG. 12 is a diagram of a matching relationship between a first door plate fastening bracket and a second housing fastening bracket according to an embodiment of this application.

In this application, the first door plate fastening bracket 10112 may be rotatably connected to the second housing fastening bracket 1014. The first door plate fastening bracket 10112 may be rotatably connected to the second housing fastening bracket 1014 through a virtual axis. It should be noted that, in this application, the virtual axis is an axis center of an arc-shaped structure, and two rotating-connected components may rotate relative to the virtual axis. As the two rotating-connected components rotate relative to each other, a position of the virtual axis is fixed. When the first door plate fastening bracket 10112 is rotatably connected to the second housing fastening bracket 1014 through the virtual axis, refer to FIG. 12. FIG. 12 is a diagram of a matching relationship between the first door plate fastening bracket 10112 and the second housing fastening bracket 1014 according to an embodiment of this application. A first arc-shaped groove 101122 is disposed at an end portion that is of the first door plate fastening bracket 10112 and that faces the second housing fastening bracket 1014, and a second arc-shaped rotating block 10142 is disposed on the second housing fastening bracket 1014. Refer to FIG. 8 and FIG. 12 together. The second arc-shaped rotating block 10142 is mounted on the first arc-shaped groove 101122, and the second arc-shaped rotating block 10142 is capable of sliding along a groove surface of the first arc-shaped groove 101122, so that the first door plate fastening bracket 10112 and the second housing fastening bracket 1014 rotate relative to each other.

It may be understood that, in a possible embodiment of this application, the second arc-shaped rotating block 10142 may be further disposed at an end portion that is of the first door plate fastening bracket 10112 and that faces the second housing fastening bracket 1014, and the first arc-shaped groove 101122 is disposed on the second housing fastening bracket 1014. Similarly, the second arc-shaped rotating block 10142 is capable of sliding along the groove surface of the first arc-shaped groove 101122 to implement relative rotation of the first door plate fastening bracket 10112 and the second housing fastening bracket 1014.

It should be noted that, for an inward foldable electronic device, the first door plate fastening bracket 10112 is rotatably connected to the second housing fastening bracket 1014 through the virtual axis, and an axis center at which the second housing fastening bracket 1014 rotates relative to the first door plate fastening bracket 10112 is located on a side that is of the first door plate fastening bracket 10112 and that faces the flexible display.

In this application, the first door plate fastening bracket 10112 may be rotatably connected to the second housing fastening bracket 1014 through the virtual axis as well as a solid shaft, so that the first door plate fastening bracket 10112 and the second housing fastening bracket 1014 are connected reliably.

Based on the hinge mechanism 1 provided in the foregoing embodiment of this application, with reference to FIG. 8 and FIG. 9 together, in a process of the electronic device from the unfolded state to the folded state, when the first housing fastening bracket 1013 and the second housing fastening bracket 1014 move toward each other, and the first housing fastening bracket 1013 drives the first support arm 10111 to rotate around the main shaft 102 in a clockwise direction, the first support arm 10111 may slide in the first sliding groove 10131 relative to the first housing fastening bracket 1013 in a direction facing the main shaft 102. Because the first support arm 10111 is rotatably connected to the first connecting member 10113 through the first connecting rod 10114, and the first support arm 10111 is rotatably connected to the main shaft 102 through the second rotating shaft 10116, in a process in which the first support arm 10111 rotates around the main shaft 102 in a clockwise direction, the first support arm 10111 may push, based on a lever principle by using the first connecting rod 10114, the first connecting member 10113 to move toward the first door plate fastening bracket 10112 in the first track slot 1021. In this way, the first door plate fastening bracket 10112 is pushed to rotate around the main shaft 102 in a counterclockwise direction. In addition, because the first door plate fastening bracket 10112 is rotatably connected to the second housing fastening bracket 1014, the first door plate fastening bracket 10112 rotates around the main shaft 102 in a counterclockwise direction, to drive the second housing fastening bracket 1014 to rotate around the main shaft 102 in the counterclockwise direction. However, in a process of the electronic device from the folded state to the unfolded state, when the first housing fastening bracket 1013 and the second housing fastening bracket 1014 move oppositely, and the first housing fastening bracket 1013 drives the first support arm 10111 to rotate around the main shaft 102 in the counterclockwise direction, the first support arm 10111 may pull, by using the first connecting rod 10114, the first connecting member 10113 to move toward the first support arm 10111 in the first track slot 1021. Therefore, the first door plate fastening bracket 10112 may be driven to rotate around the main shaft 102 in the clockwise direction, so that the first door plate fastening bracket 10112 drives the second housing fastening bracket 1014 to rotate around the main shaft 102 in the clockwise direction. This implements folding and unfolding functions of the hinge mechanism 1.

For some existing hinge mechanisms 1, to ensure stability of the mechanisms, thickness of a rotating component connected to the main shaft 102 needs to be increased. In this way, both the main shaft 102 and the hinge mechanism 1 are very thick. If the main shaft 102 and the hinge mechanism 1 are forcibly thinned, strength of the rotating component is easily weakened. In addition, when the electronic device falls down, the rotating component has a risk of falling off from the main shaft 102, which greatly affects reliability of the hinge mechanism 1. As a result, a service life of the electronic device is shortened. The hinge mechanism 1 in this application has a simplified structure. According to the foregoing structural relationship, a cross section of the first sliding block 101131 of the first connecting member 10113 may be small, so that the first sliding block 101131 can slide through the first track slot 1021 of the main shaft 102. In addition, because the first connecting member 10113 can extend sufficiently in a direction perpendicular to an axial direction, and the first connecting member 10113 is separately connected to the first support arm 10111 and the first door plate fastening bracket 10112, reliability of the hinge mechanism 1 can be ensured. This not only reduces thickness of the main shaft 102 and thickness of an entire machine, but also maintains reliability of the hinge mechanism 1, so that the entire hinge mechanism 1 is light, thin, and reliable.

In addition, because the first connecting member 10113 may move in the first track slot 1021 according to a specified trajectory, uncontrolled movement of the first connecting member 10113 in an entire process of folding and unfolding can be avoided, and random movement of the first housing fastening bracket 1013 and the second housing fastening bracket 1014 is further avoided. This ensures structure and motion stability of the entire hinge mechanism 1. In some cases, the first track slot 1021 is appropriately designed, so that an inner tangent line of the hinge mechanism 1 can keep a constant length in an entire process of folding and unfolding, and a length of the flexible display covering a surface of the hinge mechanism 1 can basically keep unchanged. In this way, extrusion or pulling of the flexible display can be effectively avoided, which improves structural reliability of the flexible display and further improves structural reliability of the electronic device.

Still refer to FIG. 6. A structure of the second rotating component 1012 is similar to that of the first rotating component loll. When the second rotating component 1012 is specifically disposed, the second rotating component 1012 is located between the first housing fastening bracket 1013 and the second housing fastening bracket 1014. In addition, the second rotating component 1012 may include a second support arm 10121, a second door plate fastening bracket 10122, and a second connecting member 10123. The second connecting member 10123 is located between the second support arm 10121 and the second door plate fastening bracket 10122, the second connecting member 10123 is rotatably connected to the second support arm 10121, and the second connecting member 10123 is rotatably connected to the second door plate fastening bracket 10122. In this application, for a manner in which the second connecting member 10123 is rotatably connected to the second support arm 10121 and the second door plate fastening bracket 10122, refer to a manner in which the first connecting member 10113 is rotatably connected to the second support arm 10121 and the second door plate fastening bracket 10122. For example, FIG. 7 may also be used to indicate a matching relationship between the second connecting member 10123 and the main shaft 102 according to an embodiment of this application. A second track slot 1023 is disposed on the main shaft 102, and the second connecting member 10123 is mounted in the second track slot 1023 and may move relative to the main shaft 102 along the second track slot 1023, so that the second track slot 1023 limits a motion trajectory of the second connecting member 10123. When the second connecting member 10123 is specifically disposed, the second connecting member 10123 may include a second sliding block 101231. The second sliding block 101231 may be mounted in the second track slot 1023 and may move along the second track slot 1023. In this way, the second track slot 1023 limits the motion trajectory of the second connecting member 10123, so that a position of the second connecting member 10123 is stable and no virtual position shaking occurs in a process of the unfolded state and the folded state of the hinge mechanism 1. This improves reliability of the hinge mechanism 1 in the foregoing two states.

In this application, a form of the second track slot 1023 is not specifically limited. For example, the second track slot 1023 may be an arc-shaped slot shown in FIG. 7, and the arc-shaped slot may be a circle arc-shaped slot, an elliptical arc-shaped slot, or an arc-shaped slot of another possible form. The second sliding block 101231 may be an arc-shaped sliding block, and the arc-shaped sliding block may be a circle arc-shaped sliding block, an elliptical arc-shaped sliding block, an arc-shaped sliding block in another possible form, or the like. In this case, the second sliding block 101231 may rotate relative to the main shaft 102 along the second track slot 1023. This implements a rotating connection between the second connecting member 10123 and the main shaft 102, to limit a motion trajectory of the second connecting member 10123.

In some other possible embodiments of this application, the second sliding block 101231 may further slide relative to the main shaft 102 along the second track slot 1023. This implements a sliding connection between the second connecting member 10123 and the main shaft 102, to limit a motion trajectory of the second connecting member 10123. During specific implementation, the second track slot 1023 may also be a straight-line slot, and the second sliding block 101231 may be adaptively disposed as a straight-line sliding block. It may be understood that, in this application, a shape of the second sliding block 101231 matches a shape of the second track slot 1023, to improve smoothness of sliding of the second sliding block 101231 along the second track slot 1023.

Still refer to FIG. 7. The main shaft 102 may be further provided with a second mounting groove 1024, and the second connecting member 10123 is mounted in the second mounting groove 1024. In this way, a structure of the hinge mechanism 1 may be compact, to facilitate a miniaturization design of the hinge mechanism 1. The second track slot 1023 may be disposed on a groove wall that is of the second mounting groove 1024 and that is disposed in an axial direction of the hinge mechanism 1, and the second sliding block 101231 may be disposed at an end portion of the second connecting member 10123 in the axial direction of the hinge mechanism 1.

Refer to FIG. 5 and FIG. 7 together. The second connecting member 10123 may include a third bearing sub-surface 101232. When the electronic device is in an unfolded state, the first bearing sub-surface 1025, the second bearing sub-surface 101132, and the third bearing sub-surface 101232 may be jointly configured to flatly support the flexible display. This helps improve reliability of supporting the flexible display by the hinge mechanism 1 when the electronic device is in the unfolded state.

It should be noted that, in a possible embodiment of this application, the entire second connecting member 10123 may be used as the second sliding block 101231. In this case, the second track slot 1023 may be correspondingly adjusted, so that the entire second connecting member 10123 may be mounted in the second track slot 1023, and move relative to the main shaft 102 along the second track slot 1023.

In this application, in a process of the electronic device from the unfolded state to the folded state or from the folded state to the unfolded state, the second support arm 10121 and the second door plate fastening bracket 10122 are mutually pulled through the second connecting member 10123, so that the second support arm 10121 and the second door plate fastening bracket 10122 rotate around the main shaft 102. Specifically, when the second support arm 10121 is rotatably connected to the second connecting member 10123, reference may still be made to FIG. 6. The second rotating component 1012 may further include a second connecting rod 10124, the second connecting rod 10124 is located between the second support arm 10121 and the second connecting member 10123, the second support arm 10121 is rotatably connected to the second connecting rod 10124, the second connecting member 10123 is rotatably connected to the second connecting rod 10124, and an axis along which the second support arm 10121 rotates relative to the second connecting rod 10124 is parallel to but not coincident with an axis along which the second connecting member 10123 rotates relative to the second connecting rod 10124. During specific implementation, the second connecting rod 10124 is rotatably connected to the second support arm 10121 through a fifth rotating shaft, and an axis of the fifth rotating shaft extends in the axial direction of the hinge mechanism 1. In addition, refer to FIG. 6. The second support arm 10121 may be provided with a fourth avoidance opening, and at least a part of the second connecting rod 10124 may be accommodated in the fourth avoidance opening, so that a structure of the second rotating component 1012 may be compact, to help reduce a size of the hinge mechanism 1.

In addition, the second support arm 10121 may be rotatably connected to the main shaft 102 through a sixth rotating shaft. The axis of the fifth rotating shaft is parallel to but not coincident with an axis of the sixth rotating shaft, and the sixth rotating shaft is located on a side that is of the fifth rotating shaft and that is away from the flexible display.

In this application, the second connecting rod 10124 is rotatably connected to the second connecting member 10123 through a seventh rotating shaft, and an axis of the seventh rotating shaft is parallel to but not coincident with the axis of the fifth rotating shaft. In addition, a fifth avoidance opening may be disposed at an end portion that is of the second connecting member 10123 and that faces the second connecting rod 10124, and at least a part of the second connecting member 10123 may be accommodated in the fifth avoidance opening, so that a structure of the second rotating component 1012 is compact.

In this application, the second connecting member 10123 may be rotatably connected to the second door plate fastening bracket 10122 through an eighth rotating shaft, and an axis of the eighth rotating shaft is parallel to but not coincident with the axis of the seventh rotating shaft. In addition, a sixth avoidance opening may be disposed at an end portion that is of the second connecting member 10123 and that faces the second door plate fastening bracket 10122, a second protruding portion may be disposed at an end portion that is of the second door plate fastening bracket 10122 and that faces the second connecting member 10123, and the second protruding portion may be accommodated in the sixth avoidance opening, so that the second protruding portion may be rotatably connected to the second connecting member 10123 through the eighth rotating shaft, to implement a rotating connection between the second connecting member 10123 and the second door plate fastening bracket 10122. In this way, the structure of the second rotating component 1012 is compact.

In this application, the second support arm 10121 is slidably connected to the second housing fastening bracket 1014. During specific implementation, refer to FIG. 11. FIG. 11 may also be used to show a matching relationship between the second support arm 10121 and the second housing fastening bracket 1014. A second sliding groove 10141 is disposed on the second housing fastening bracket 1014, and the second sliding groove 10141 extends in a second direction. The second support arm 10121 may be mounted in the second sliding groove 10141, and may slide in the second sliding groove 10141 in the second direction. The second direction may be a direction in which the second housing fastening bracket 1014 moves toward or away from the main shaft 102. In addition, to prevent the second support arm 10121 from falling off from the second sliding groove 10141, a second slide rail 101411 may be disposed on a groove wall of the second sliding groove 10141, and a second guiding portion 101211 is disposed on the second support arm 10121. In this way, the second guiding portion 101211 may be clamped on the second slide rail 101411, and the second guiding portion 101211 may slide along the second slide rail 101411, to limit a position of the second support arm 10121 in the second sliding groove 10141. In addition, the second slide rail 101411 is disposed on the groove wall of the second sliding groove 10141, to provide guidance for the second support arm 10121 to slide along the second sliding groove 10141. This improves motion stability of the second support arm 10121.

In addition, the second door plate fastening bracket 10122 may be rotatably connected to the first housing fastening bracket 1013. The second door plate fastening bracket 10122 may be rotatably connected to the first housing fastening bracket 1013 through a virtual axis. During specific implementation, still refer to FIG. 12. FIG. 12 may also be used to show a matching relationship between the second door plate fastening bracket 10122 and the first housing fastening bracket 1013. A second arc-shaped groove is disposed at an end portion that is of the second door plate fastening bracket 10122 and that faces the first housing fastening bracket 1013, and a first arc-shaped rotating block 10132 is disposed on the first housing fastening bracket 1013. In this case, the first arc-shaped rotating block 10132 is mounted in the second arc-shaped groove, and the first arc-shaped rotating block 10132 may slide along a groove surface of the second arc-shaped groove, so that the second door plate fastening bracket 10122 rotates relative to the first housing fastening bracket 1013.

It may be understood that, in a possible embodiment of this application, the first arc-shaped rotating block 10132 may be further disposed at an end portion that is of the second door plate fastening bracket 10122 and that faces the first housing fastening bracket 1013, and the second arc-shaped groove 101221 is disposed on the first housing fastening bracket 1013. Similarly, the first arc-shaped rotating block 10132 may slide along the groove surface of the second arc-shaped groove 101221 to implement relative rotation of the second door plate fastening bracket 10122 and the first housing fastening bracket 1013.

It should be noted that, for an inward foldable electronic device, the second door plate fastening bracket 10122 is rotatably connected to the first housing fastening bracket 1013 through the virtual axis, and an axis center at which the first housing fastening bracket 1013 rotates relative to the second door plate fastening bracket 10122 is located on a side that is of the second door plate fastening bracket 10122 and that faces the flexible display.

In this application, the second door plate fastening bracket 10122 may be rotatably connected to the first housing fastening bracket 1013 through the virtual axis as well as a solid shaft, so that the second door plate fastening bracket 10122 and the first housing fastening bracket 1013 are connected reliably.

Based on the hinge mechanism 1 provided in the foregoing embodiment of this application, in a process of the electronic device from an unfolded state to a folded state, when the first housing fastening bracket 1013 and the second housing fastening bracket 1014 move toward each other, and the second housing fastening bracket 1014 drives the second support arm 10121 to rotate around the main shaft 102 in a counterclockwise direction, the second support arm 10121 may slide in the second sliding groove 10141 relative to the second housing fastening bracket 1014 in a direction facing the main shaft 102. Because the second support arm 10121 is rotatably connected to the second connecting member 10123 through the second connecting rod 10124, and the second support arm 10121 is rotatably connected to the main shaft 102 through the sixth rotating shaft, in a process in which the second support arm 10121 rotates around the main shaft 102 in a clockwise direction, the second support arm 10121 may push, based on a lever principle by using the second connecting rod 10124, the second connecting member 10123 to move toward the second door plate fastening bracket 10122 in the second track slot 1023. In this way, the second door plate fastening bracket 10122 is pushed to rotate around the main shaft 102 in the clockwise direction. In addition, because the second door plate fastening bracket 10122 is rotatably connected to the first housing fastening bracket 1013, the second door plate fastening bracket 10122 rotates around the main shaft 102 in the clockwise direction, to drive the first housing fastening bracket 1013 to rotate around the main shaft 102 in the clockwise direction. However, in a process of the electronic device from the folded state to the unfolded state, when the first housing fastening bracket 1013 and the second housing fastening bracket 1014 move oppositely, and the second housing fastening bracket 1014 drives the second support arm 10121 to rotate around the main shaft 102 in the clockwise direction, the second support arm 10121 may pull, by using the second connecting rod 10124, the second connecting member 10123 to move toward the second support arm 10121 in the second track slot 1023. Therefore, the second door plate fastening bracket 10122 may be driven to rotate around the main shaft 102 in a counterclockwise direction, so that the second door plate fastening bracket 10122 drives the first housing fastening bracket 1013 to rotate around the main shaft 102 in the counterclockwise direction. This implements folding and unfolding functions of the hinge mechanism 1.

For some existing hinge mechanisms 1, to ensure stability of the mechanisms, thickness of a rotating component connected to the main shaft 102 needs to be increased. In this way, both the main shaft 102 and the hinge mechanism 1 are very thick. If the main shaft 102 and the hinge mechanism 1 are forcibly thinned, strength of the rotating component is easily weakened. In addition, when the electronic device falls down, the rotating component has a risk of falling off from the main shaft 102, which greatly affects reliability of the hinge mechanism 1. As a result, a service life of the electronic device is shortened. The hinge mechanism 1 in this application has a simplified structure. According to the foregoing structural relationship, a cross section of the second sliding block 101231 of the second connecting member 10123 may be small, so that the second sliding block 101231 can slide through the second track slot 1023 of the main shaft 102. In addition, because the second connecting member 10123 can extend sufficiently in a direction perpendicular to an axial direction, and the second connecting member 10123 is separately connected to the first support arm and second support arm, and the second door plate fastening bracket 10122, reliability of the hinge mechanism 1 can be ensured. This not only reduces thickness of the main shaft 102 and thickness of an entire machine, but also maintains reliability of the hinge mechanism 1, so that the entire hinge mechanism 1 is light, thin, and reliable.

In addition, because the second connecting member 10123 may move in the second track slot 1023 according to a specified trajectory, uncontrolled movement of the second connecting member 10123 in an entire process of folding and unfolding can be avoided, and random movement of the first housing fastening bracket 1013 and the second housing fastening bracket 1014 is further avoided. This ensures structure and motion stability of the entire hinge mechanism 1. In some cases, the second track slot 1023 is appropriately designed, so that an inner tangent line of the hinge mechanism 1 can keep a constant length in an entire process of folding and unfolding, and a length of the flexible display covering a surface of the hinge mechanism 1 can basically keep unchanged. In this way, extrusion or pulling of the flexible display can be effectively avoided, which improves structural reliability of the flexible display and further improves structural reliability of the electronic device.

Figure 13:
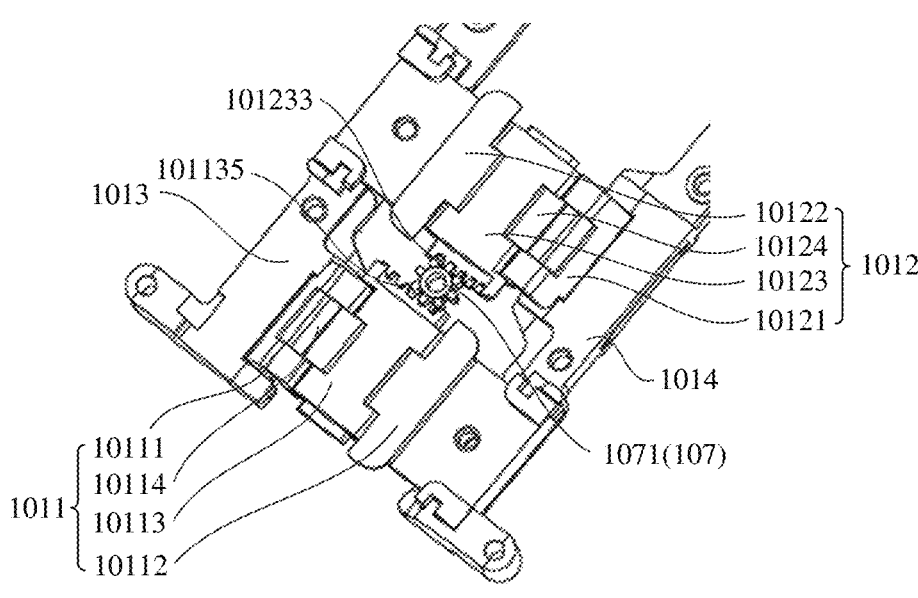
FIG. 13 is a diagram of a partial structure of a hinge mechanism according to an embodiment of this application.

FIG. 13 is a diagram of a partial structure of the hinge mechanism 1 according to an embodiment of this application, and the main shaft 102 is omitted in FIG. 13, to describe a mutual pulling motion relationship between the first rotating component 1011 and the second rotating component 1012. In this application, the first support arm 10111 is slidably connected to the first housing fastening bracket 1013, the first door plate fastening bracket 10112 is rotatably connected to the second housing fastening bracket 1014, and the first support arm 10111 may pull the first door plate fastening bracket 10112 through the first connecting member 10113 to move according to a specified trajectory. In addition, the second support arm 10121 is slidably connected to the second housing fastening bracket 1014, the second door plate fastening bracket 10122 is rotatably connected to the first housing fastening bracket 1013, and the second support arm 10121 may pull the second door plate fastening bracket 10122 by using the second connecting member 10123 to move according to a specified trajectory. In this way, movement distances of the first housing fastening bracket 1013 and the second housing fastening bracket 1014 toward or away from the main shaft 102 may be limited, so that when the electronic device is in any folded state, a distance between the first housing fastening bracket 1013 and the main shaft 102 is equal to a distance between the second housing fastening bracket 1014 and the main shaft 102. In addition, in processes in which the electronic device changes from an unfolded state to a folded state and from the folded state to the unfolded state, distances of the first housing fastening bracket 1013 moving relative to the main shaft 102 may be equal, and distances of the second housing fastening bracket 1014 moving relative to the main shaft 102 may be equal. Therefore, when the hinge mechanism 1 is used in the electronic device shown in FIG. 1, extrusion or pulling of the flexible display can be avoided while a folding function of the electronic device is implemented, to prolong a service life of the flexible display and improve reliability of the electronic device.

Figure 14:
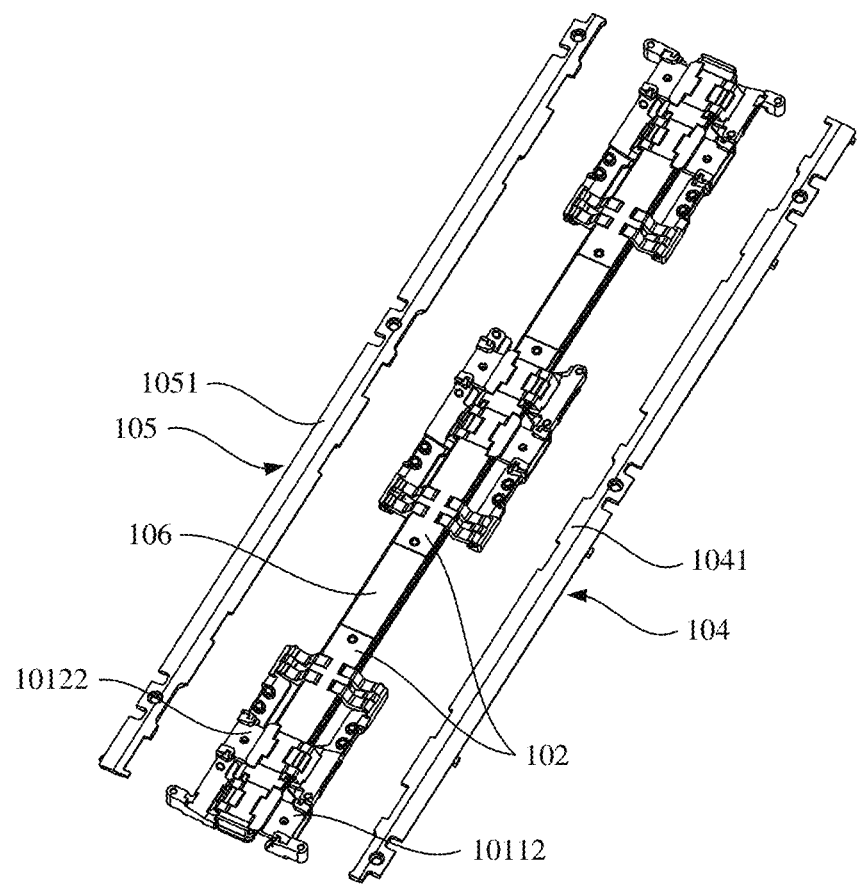
FIG. 14 is another exploded view of a hinge mechanism according to an embodiment of this application.

FIG. 14 is another exploded view of the hinge mechanism 1 according to an embodiment of this application. The hinge mechanism 1 further includes a first door plate 104 and a second door plate 105. The first door plate 104 is located on a side that is of the first door plate fastening bracket 10112 and that faces the flexible display. The first door plate 104 is fastened to the first door plate fastening bracket 10112, and the first door plate 104 includes a first plate surface 1041 disposed facing the flexible display. The second door plate 105 is located on a side that is of the second door plate fastening bracket 10122 and that faces the flexible display, the second door plate 105 is fastened to the second door plate fastening bracket 10122, and the second door plate 105 includes a second plate surface 1051 disposed facing the flexible display. Manners of connecting the first door plate 104 and the second door plate 105 of the hinge mechanism 1 provided in this application to corresponding rotating components are simple. In addition, motion driving mechanisms of the first door plate 104 and the second door plate 105 are mechanisms configured to implement folding and unfolding functions of the hinge mechanism 1, and the mechanisms can improve integration of the hinge mechanism 1, so that a structure of the hinge mechanism 1 is simplified. This facilitates a miniaturization design of the hinge mechanism 1.

In a possible embodiment of this application, the first door plate 104 and the first door plate fastening bracket 10112 may be of an integrated structure, and the second door plate 105 and the second door plate fastening bracket 10122 may be of an integrated structure, to simplify a structure of the hinge mechanism 1.

Figure 15:
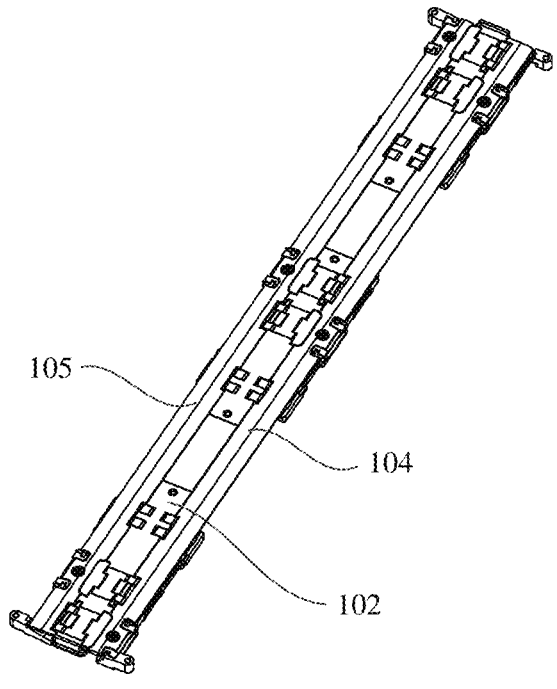
FIG. 15 is a diagram of an assembly structure of the hinge mechanism shown in FIG. 14.

It can be learned from the foregoing description of the hinge mechanism 1 that, when the hinge mechanism 1 includes a plurality of rotating modules 101, the main shaft 102 may be separately disposed for each rotating module 101. In addition, as shown in FIG. 14, the two adjacent main shafts 102 may be connected through a connecting beam 106, and a specific connection manner may be but is not limited to welding, jointing, bonding, or the like. FIG. 15 is a diagram of an assembly structure of the hinge mechanism 1 shown in FIG. 14. In this application, both the first door plate 104 and the second door plate 105 may be disposed as an integrated structure, the first door plate 104 is fastened to the first door plate fastening brackets 10112 of the plurality of rotating modules 101, and the second door plate 105 is fastened to the second door plate fastening brackets 10122 of the plurality of rotating modules 101. In this way, when the electronic device is in an unfolded state, the first door plate 104, the main shaft 102, and the second door plate 105 are jointly configured to support the flexible display, which helps improve integrity of a support surface provided by the hinge mechanism 1 for the flexible display in this state, so that the hinge mechanism 1 flatly supports the flexible display.

Figure 16:
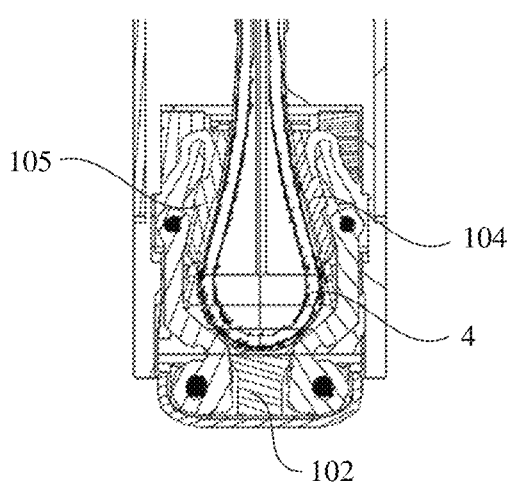
FIG. 16 is a sectional view of the hinge mechanism shown in FIG. 15 in a case in which an electronic device is in a folded state.

In addition, FIG. 16 is a sectional view of the hinge mechanism 1 shown in FIG. 15 in a case in which an electronic device is in a folded state. The sectional view may be used to show a sectional view of the first door plate 104 and the second door plate 105 in this state. As shown in FIG. 16, according to the hinge mechanism 1 provided in this application, motion trajectories of the first rotating component 1011 and the second rotating component 1012 are appropriately designed, and each rotating component is rotatably connected to one housing fastening bracket through a fixed axis center, and is slidably connected to another housing fastening bracket. In this way, screen accommodation space formed by the hinge mechanism 1 when the electronic device is in a folded state can better match a bending shape of a foldable portion of a flexible display 4. This can avoid extrusion on the flexible display 4, to help improve structural reliability of the flexible display 4. In addition, the structural design of the hinge mechanism 1 provided in this application is used, structural strength of each component of the hinge mechanism 1 may be better, which helps improve structural reliability of the hinge mechanism 1.

It may be understood that, in a process of unfolding and folding the electronic device, the first housing 2 and the second housing 3 move synchronously, so that a risk of instantaneous extrusion or pulling stress on the flexible display can be effectively reduced. Based on this, the hinge mechanism 1 provided in embodiments of this application may further include a synchronization component 107. During specific implementation, still refer to FIG. 13. The synchronization component 107 includes a synchronization gear 1071, and in an axial direction of the hinge mechanism

1, the synchronization gear 1071 is located between the first connecting member 10113 and the second connecting member 10123. In addition, a first gear surface 101135 is disposed at an end portion that is of the first connecting member 10113 and that faces the synchronization gear 1071, and a second gear surface 101233 is disposed at an end portion that is of the second connecting member 10123 and that faces the synchronization gear 1071. In this case, the first gear surface 101135 is in transmission connection to the second gear surface 101233 through the synchronization gear 1071, so that when the first connecting member 10113 rotates relative to the synchronization gear 1071, the second connecting member 10123 may be driven to move reversely and synchronously relative to the synchronization gear 1071. A quantity of synchronization gears 1071 is not limited in this application. For example, the synchronization gear 1071 may be one shown in FIG. 13. In this case, the first gear surface 101135 may be engaged with a gear surface of the synchronization gear 1071, and the second gear surface 101233 may be engaged with the gear surface of the synchronization gear 1071.

As shown in FIG. 13, the first connecting member 10113 may include two first sliding blocks 101131, and in an axial direction of the hinge mechanism 1, the two first sliding blocks 101131 are respectively disposed at two end portions of the first connecting member 10113. In this case, the first gear surface 101135 may be disposed on the first sliding block 101131 that is of the first connecting member 10113 and that faces the synchronization gear 1071. In this application, when the first connecting member 10113 includes the two first sliding blocks 101131, the first track slot 1021 may be disposed on the main shaft 102 corresponding to each first sliding block 101131, so that each first sliding block 101131 is mounted in the corresponding first track slot 1021, and each first sliding block 101131 is capable of sliding or rotating relative to the main shaft along the corresponding first track slot 1021. This can improve stability of movement of the first connecting member 10113 relative to the main shaft 102. It may be understood that, when the two first sliding blocks 101131 of the first connecting member 10113 are arc-shaped sliding blocks, forms of the two first sliding blocks 101131 may be the same or may be different, but axis centers at which the two first sliding blocks 101131 rotate relative to the main shaft 102 coincide. For example, the two first sliding blocks 101131 are circle arc-shaped sliding blocks, and radiuses of circles in which the two first sliding blocks 101131 are located are the same or different while axis centers at which the two first sliding blocks 101131 rotate relative to the main shaft 102 coincide. This improves stability of rotation of the first connecting member 10113 relative to the main shaft 102.

In this application, the second connecting member 10123 may include two second sliding blocks 101231, and in an axial direction of the hinge mechanism 1, the two second sliding blocks 101231 are respectively disposed at two end portions of the second connecting member 10123. In this case, the second gear surface 101233 may be disposed on the second sliding block 101231 that is of the second connecting member 10123 and that faces the synchronization gear 1071. In this application, when the second connecting member 10123 includes the two second sliding blocks 101231, one second track slot 1023 corresponding to each second sliding block 101231 may be disposed on the main shaft 102, so that each second sliding block 101231 is mounted in the corresponding second track slot 1023, and each second sliding block 101231 may slide or rotate relative to the main shaft along the corresponding second track slot 1023. This can improve stability of movement of the second connecting member 10123 relative to the main shaft 102. It may be understood that, when the two second sliding blocks 101231 of the second connecting member 10123 are arc-shaped sliding blocks, forms of the two second sliding blocks 101231 may be the same or may be different, but axis centers at which the two second sliding blocks 101231 rotate relative to the main shaft 102 coincide. For example, the two second sliding blocks 101231 are circle arc-shaped sliding blocks, and radiuses of circles in which the two second sliding blocks 101231 are located are the same or different while axis centers at which the two second sliding blocks 101231 rotate relative to the main shaft 102 coincide. This improves stability of movement of the second connecting member 10123 relative to the main shaft 102.

In this application, the first gear surface 101135 of the first connecting member 10113 is disposed on one first sliding block 101131 of the first connecting member 10113, and the second gear surface 101233 of the second connecting member 10123 is disposed on one second sliding block 101231 of the second connecting member 10123, so that synchronous rotation of the first housing fastening bracket 1013 and the second housing fastening bracket 1014 can be implemented, and a structure of the hinge mechanism 1 is compact, to facilitate a miniaturization design of the hinge mechanism 1.

Based on the foregoing description of the hinge mechanism 1 provided in this embodiment of this application, in a process of the electronic device from the unfolded state to the folded state, the first housing fastening bracket 1013 rotates around the main shaft 102 in a clockwise direction, to drive the first support arm 10111 to rotate around the main shaft 102 in the clockwise direction, so that the first support arm 10111 pushes, by using the first connecting rod 10114, the first connecting member 10113 to move toward the first door plate fastening bracket 10112 in the first track slot 1021. In addition, because the first connecting member 10113 is in transmission connection to the second connecting member 10123 through the synchronization gear 1071, the first connecting member 10113 moves toward the first door plate fastening bracket 10112 in the first track slot 1021, to drive the second connecting member 10123 to move toward the second door plate fastening bracket 10122 in the second track slot 1023, so that the second door plate fastening bracket 10122 pulls, by using the second connecting rod 10124, the second connecting member 10123 to rotate around the main shaft 102 in a counterclockwise direction. Further, the second housing fastening bracket 1014 is driven to rotate synchronously around the main shaft 102 in the counterclockwise direction. Therefore, the first housing fastening bracket 1013 and the second housing fastening bracket 1014 can rotate synchronously and toward each other. In addition, in a process of the electronic device from the folded state to the unfolded state, a movement direction of each structure is opposite to a movement direction in the foregoing process of the electronic device from the unfolded state to the folded state, and details are not described herein. In this way, the first housing fastening bracket 1013 and the second housing fastening bracket 1014 rotate synchronously and oppositely.

According to the hinge mechanism 1 provided in this application, folding and unfolding functions of the hinge mechanism 1 may be implemented through mutual pulling between structures that are connected through rotation. In addition, disposing of the synchronization component 107 allows the two housing fastening brackets to rotate in synchronism toward or opposite to each other, so that rotation of the hinge mechanism 1 is reliable. In addition, because structures of both a mechanism for implementing a rotation function and a mechanism for implementing a synchronization function of the hinge mechanism 1 are simple, a structure of the entire hinge mechanism 1 can be effectively simplified. This facilitates a miniaturization design of the hinge mechanism 1 and reduces costs of the hinge mechanism 1.

Figure 17:
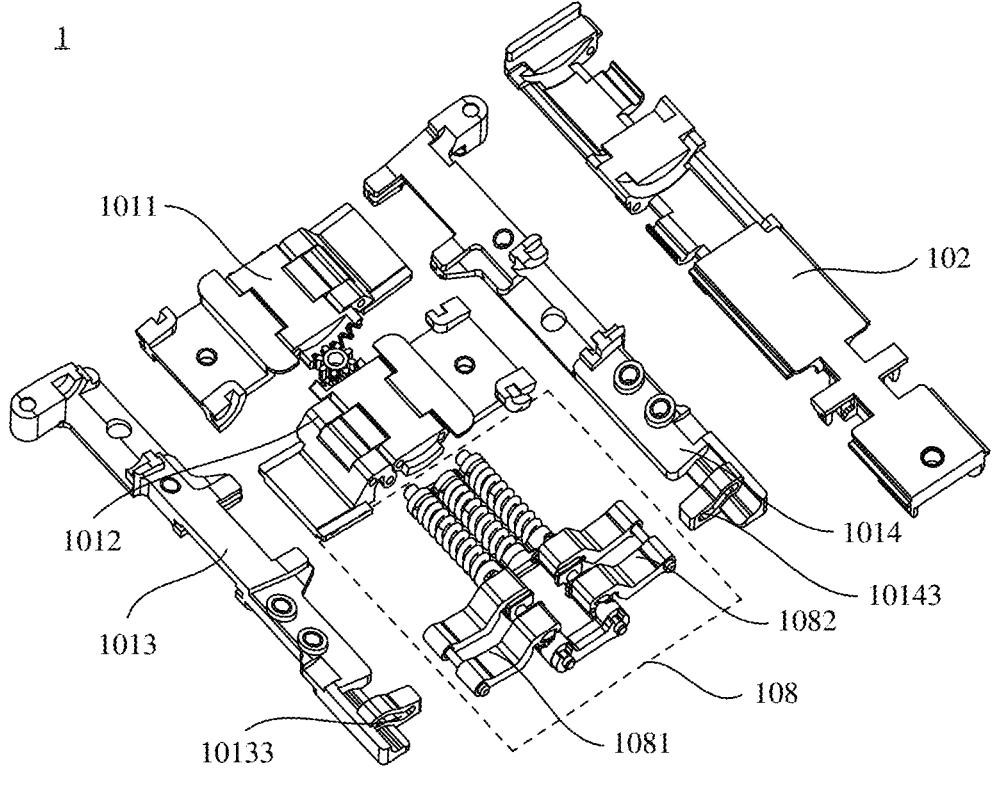
FIG. 17 is another exploded view of the structure shown in FIG. 5.

FIG. 17 is another exploded view of the structure shown in FIG. 5. The hinge mechanism 1 provided in this embodiment of this application may further include a damping module 108. The damping module 108 includes a first swing rod component 1081 and a second swing rod component 1082. The first swing rod component 1081 and the second swing rod component 1082 are rotatably connected to the main shaft 102, the first swing rod component 1081 and the first housing fastening bracket 1013 are located on a same side of the main shaft 102, and the second swing rod component 1082 and the second housing fastening bracket 1014 are located on a same side of the main shaft 102.

Figure 18:
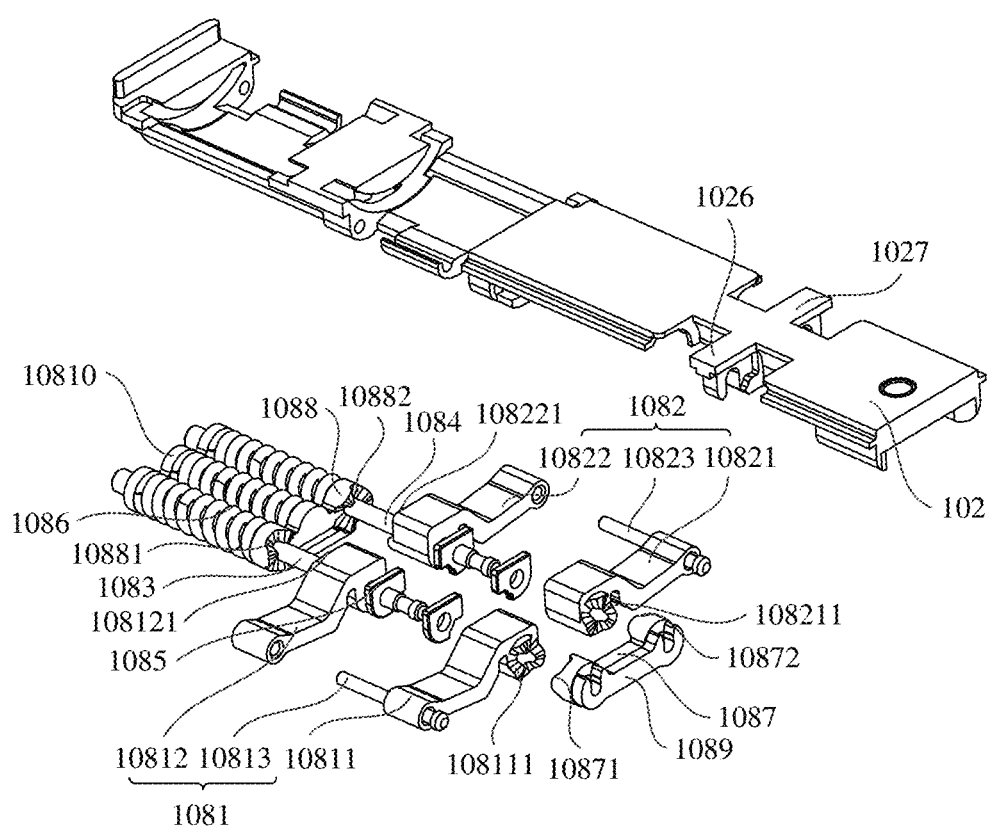
FIG. 18 is a diagram of a matching relationship between a damping module and a main shaft according to an embodiment of this application.

FIG. 18 is a diagram of a matching relationship between the damping module 108 and the main shaft 102 according to an embodiment of this application. The main shaft 102 further includes a first mounting portion 1026 and a second mounting portion 1027. The first swing rod component 1081 is rotatably connected to the first mounting portion 1026 through a first shaft 1083, the second swing rod component 1082 is rotatably connected to the second mounting portion 1027 through a second shaft 1084, and the first shaft 1083 is parallel to but not coincident with the second shaft 1084. During specific implementation, the first swing rod component 1081 includes a first swing rod 10811 and a second swing rod 10812. In an axial direction of the hinge mechanism 1, the first mounting portion 1026 is located between the first swing rod 10811 and the second swing rod 10812, and the first shaft 1083 may simultaneously penetrate through the first swing rod 10811, the first mounting portion 1026, and the second swing rod 10812. Therefore, the first swing rod 10811 and the second swing rod 10812 are rotatably connected to the first mounting portion 1026 through the first shaft 1083. In this way, the first swing rod component 1081 is rotatably connected to the main shaft 102.

Similarly, the second swing rod component 1082 includes a third swing rod 10821 and a fourth swing rod 10822. In the axial direction of the hinge mechanism 1, the second mounting portion 1027 is located between the third swing rod 10821 and the fourth swing rod 10822, and the second shaft 1084 may simultaneously penetrate through the third swing rod 10821, the second mounting portion 1027, and the fourth swing rod 10822. Therefore, the third swing rod 10821 and the fourth swing rod 10822 are rotatably connected to the second mounting portion 1027 through the second shaft 1084. In this way, the second swing rod component 1082 is rotatably connected to the main shaft 102.

As shown in FIG. 18, in this application, the damping module 108 further includes a gasket 1085. In this embodiment of this application, the damping module 108 includes a plurality of gaskets 1085, at least one gasket 1085 is located between the first swing rod 10811 and the second swing rod 10812, and at least one gasket 1085 is located between the third swing rod 10821 and the fourth swing rod 10822. For example, at least one gasket 1085 is located between the first swing rod 10811 and the first mounting portion 1026 and is sleeved on the first shaft 1083, at least one gasket 1085 is located between the second swing rod 10812 and the first mounting portion 1026 and is sleeved on the first shaft 1083, at least one gasket 1085 is located between the third swing rod 10821 and the second mounting portion 1027 and is sleeved on the second shaft 1084, and at least one gasket 1085 is located between the fourth swing rod 10822 and the second mounting portion 1027 and is sleeved on the second shaft 1084.

The damping module 108 further includes an elastic component 1086. A specific disposing form of the elastic component 1086 is not limited in this application. For example, the elastic component 1086 includes a plurality of springs, at least one spring is sleeved on the first shaft 1083, and at least one spring is sleeved on the second shaft 1084, to improve motion reliability of the elastic component 1086, and enable the elastic component 1086 to generate an elastic force in the axial direction of the hinge mechanism 1.

In this case, in the axial direction of the hinge mechanism 1, under action of the elastic force of the elastic component 1086, the first swing rod 10811 and the second swing rod 10812 press the gasket 1085 located between the first swing rod 10811 and the second swing rod 10812 toward the first mounting portion 1026, and the third swing rod 10821 and the fourth swing rod 10822 press the gasket 1085 located between the third swing rod 10821 and the fourth swing rod 10822 toward the second mounting portion 1027.

Still refer to FIG. 18. In the axial direction of the hinge mechanism 1, a first slot 10261 is disposed on at least one side surface of the first mounting portion 1026, and the at least one gasket 1085 located between the first swing rod 10811 and the second swing rod 10812 is clamped into the first slot 10261. In a direction in which the first swing rod component 1081 rotates relative to the main shaft 102, the gasket 1085 located between the first swing rod 10811 and the second swing rod 10812 is relatively fastened to the first mounting portion 1026. In this way, in a process in which the first swing rod component 1081 rotates around the main shaft 102, the gasket 1085 may be prevented from rotating around the main shaft 102 along with the first swing rod component 1081. In addition, because the first swing rod component 1081 and the gasket 1085 are in extrusion contact under action of the elastic force of the elastic component 1086, when the first swing rod component 1081 rotates relative to the main shaft 102, frictional resistance may be generated between the first swing rod component 1081 and the gasket 1085, and the frictional resistance may be used as a damping force that prevents the first swing rod component 1081 from rotating relative to the main shaft 102.

It may be understood that, in this application, when at least one gasket 1085 is disposed between the first swing rod 10811 and the first mounting portion 1026, and at least one gasket 1085 is disposed between the second swing rod 10812 and the first mounting portion 1026, the first slot 10261 may be disposed on both a side surface that is of the first mounting portion 1026 and that faces the first swing rod 10811 and a side surface that is of the first mounting portion 1026 and that faces the second swing rod 10812. In this case, the gaskets 1085 located between the first swing rod 10811 and the second swing rod 10812 may be respectively clamped into corresponding first slots 10261.

Figure 19:
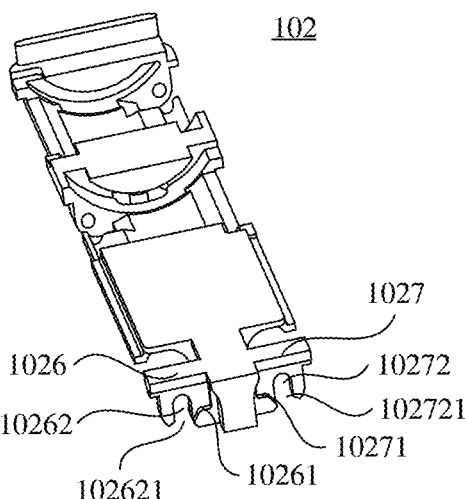
FIG. 19 is a diagram of a partial structure of a main shaft according to an embodiment of this application.

FIG. 19 is a diagram of a partial structure of a main shaft according to an embodiment of this application. The first mounting portion 1026 is provided with a first mounting hole 10262, the first mounting hole 10262 includes a first opening 102621, and the first opening 102621 is provided in a direction away from a flexible display. Therefore, when the damping module 108 is assembled with the main shaft 102, the first shaft 1083 may be mounted in the first mounting hole 10262 through the first opening 102621. In addition, movement of the gasket 1085 in a direction of the first opening 102621 may be limited by clamping the gasket 1085 between the first swing rod 10811 and the second swing rod 10812 into the first slot 10261 of the first mounting portion 1026. This can not only simplify an assembly process of the damping module 108 and the main shaft 102, but also prevent the damping module 108 from falling off from the main shaft 102, to help improve structural reliability of the hinge mechanism 1.

Similarly, still refer to FIG. 18 and FIG. 19. In the axial direction of the hinge mechanism 1, a second slot 10271 is disposed on at least one side surface of the second mounting portion 1027, and the gasket 1085 located between the third swing rod 10821 and the fourth swing rod 10822 is clamped into the second slot 10271. In a direction in which the second swing rod component 1082 rotates relative to the main shaft 102, the gasket 1085 located between the third swing rod 10821 and the fourth swing rod 10822 is relatively fastened to the second mounting portion 1027. In this way, in a process in which the second swing rod component 1082 rotates around the main shaft 102, the gasket 1085 may be prevented from rotating around the main shaft 102 along with the second swing rod component 1082. In addition, because the second swing rod component 1082 and the gasket 1085 are in extrusion contact under action of the elastic force of the elastic component 1086, when the second swing rod component 1082 rotates relative to the main shaft 102, frictional resistance may be generated between the second swing rod component 1082 and the gasket 1085, and the frictional resistance may be used as a damping force that prevents the second swing rod component 1082 from rotating relative to the main shaft 102.

It may be understood that, in this application, when the at least one gasket 1085 is disposed between the third swing rod 10821 and the second mounting portion 1027, and the at least one gasket 1085 is disposed between the fourth swing rod 10822 and the second mounting portion 1027, the second slot 10271 may be disposed on a side surface that is of the second mounting portion 1027 and that faces the third swing rod 10821 and a side surface that is of the second mounting portion 1027 and that faces the fourth swing rod 10822. In this case, the gasket 1085 located between the third swing rod 10821 and the fourth swing rod 10822 may be separately clamped into corresponding second slots 10271.

As shown in FIG. 19, the second mounting portion 1027 is provided with a second mounting hole 10272, the second mounting hole 10272 includes a second opening 102721, and the second opening 102721 is provided in a direction away from a flexible display. Therefore, when the damping module 108 is assembled with the main shaft 102, the second shaft 1084 may be mounted in the second mounting hole 10272 through the second opening 102721. In addition, movement of the gasket 1085 in a direction of the second opening 102721 may be limited by clamping the gasket 1085 between the first swing rod 10811 and the second swing rod 10812 into the second slot 10271 of the second mounting portion 1027. This can not only simplify an assembly process of the damping module 108 and the main shaft 102, but also prevent the damping module 108 from falling off from the main shaft 102, to help improve structural reliability of the hinge mechanism 1.

In this embodiment of this application, a specific shape of the gasket 1085 is not limited. For example, the gasket 1085 may be in a regular shape like a polygon, or may be in some possible abnormal shapes, provided that the gasket 1085 can be relatively fastened to a corresponding mounting portion in a rotation direction by clamping the gasket 1085 into a corresponding slot.

Still refer to FIG. 18. The damping module 108 may further include a first conjoined cam 1087, and the first conjoined cam 1087 is sleeved on the first shaft 1083 and the second shaft 1084. In the axial direction of the hinge mechanism 1, the first swing rod component 1081 is located between the elastic component 1086 and the first conjoined cam 1087, and the second swing rod component 1082 is located between the elastic component 1086 and the first conjoined cam 1087. A first cam surface 108111 is disposed on an end surface that is of the first swing rod 10811 and that faces the first conjoined cam 1087, and a third cam surface 108211 is disposed on an end surface that is of the third swing rod 10821 and that faces the first conjoined cam 1087. In addition, the first conjoined cam 1087 includes a fifth cam surface 10871 disposed toward the first swing rod 10811 and a sixth cam surface 10872 disposed toward the third swing rod 10821. In the axial direction of the hinge mechanism 1, under action of the elastic force of the elastic component 1086, the first cam surface 108111 abuts against the fifth cam surface 10871, and the third cam surface 108211 abuts against the sixth cam surface 10872.

In this application, in an axial direction of each corresponding axis, the cam surface may include a protrusion portion and a recess portion, and an oblique surface exists in a process of transition from the protrusion portion to the recess portion or from the recess portion to the protrusion portion. Therefore, in a process in which the first swing rod component 1081 and the second swing rod component 1082 rotate around corresponding rotating shafts, a corresponding damping force may be generated when oblique surfaces of two cam surfaces that abut against each other are in contact. Existence of the damping force may implement a self-unfolding function of the electronic device at an end stage of an unfolded state and a self-folding function of the electronic device at an end stage of a folded state, and under action of the damping force, a user can have an obvious jerk sense in a process of opening and closing the electronic device, to improve user experience.

It may be understood that, a damping force provided by the hinge mechanism 1 may be increased by increasing a quantity of cam surfaces that abut against each other in the damping module 108. Based on this, still refer to FIG. 18. The damping module 108 may further include a second conjoined cam 1088, and the second conjoined cam 1088 is sleeved on the first shaft 1083 and the second shaft 1084. The second conjoined cam 1088 is located between the elastic component 1086 and the first swing rod component 1081, and the second conjoined cam 1088 is located between the elastic component 1086 and the second swing rod component 1082. Therefore, the first swing rod component 1081 is located between the first conjoined cam 1087 and the second conjoined cam 1088, and the second swing rod component 1082 is located between the first conjoined cam 1087 and the second conjoined cam 1088.

In addition, a second cam surface 108121 is disposed on an end surface that is of the second swing rod 10812 and that faces the second conjoined cam 1088, and a fourth cam surface 108221 is disposed on an end surface that is of the fourth swing rod 10822 and that faces the second conjoined cam 1088. In addition, the second conjoined cam 1088 includes a seventh cam surface 10881 disposed toward the second swing rod 10812 and an eighth cam surface 10882 disposed toward the fourth swing rod 10822. In the axial direction of the hinge mechanism 1, under action of the elastic force of the elastic component 1086, the second cam surface 108121 abuts against the seventh cam surface 10881, and the fourth cam surface 108221 abuts against the eighth cam surface 10882. In this way, the hinge mechanism 1 may provide a greater damping force, to improve stability of the electronic device in which the hinge mechanism 1 is used in an unfolded state, a folded state, or an intermediate state. In addition, a tactile feeling of the user in a process of opening and closing the electronic device may be further effectively improved, to improve user experience.

In this application, to enable the elastic component 1086 to press the first conjoined cam 1087, the first swing rod component 1081, and the second conjoined cam 1088 tightly, and press the first conjoined cam 1087, the second swing rod, and the second conjoined cam 1088 tightly, the damping module 108 may further include a first limiting piece 1089. In the axial direction of the hinge mechanism 1, the first conjoined cam 1087 is located between the first limiting piece 1089 and the first swing rod component 1081, and the first conjoined cam 1087 is located between the first limiting piece 1089 and the second swing rod component 1082. In addition, an end of the first limiting piece 1089 may be clamped into the first shaft 1083 through limiting, and another end of the first limiting piece 1089 may be clamped into the second shaft 1084 through limiting. In addition, in the axial direction of the hinge mechanism 1, under action of the elastic force of the elastic component 1086, the first conjoined cam 1087 abuts against the first limiting piece 1089, to avoid that structures disposed on the first shaft 1083 and the second shaft 1084 fall off from corresponding shafts. This improves structural reliability of the damping module 108.

Still refer to FIG. 18. The damping module 108 may further include a second limiting piece 10810, and the elastic component 1086 may be located between the second conjoined cam 1088 and the second limiting piece 10810. An end of the second limiting piece 10810 may be clamped into the first shaft 1083 through limiting, and another end of the second limiting piece 10810 may be clamped into the second shaft 1084 through limiting. In addition, in an axial direction of the first shaft 1083, an elastic module may abut against the second limiting piece 10810, so that structures disposed on the first shaft 1083 and the second shaft 1084 may not fall off from corresponding shafts, to improve structural reliability of the damping module 108.

Still refer to FIG. 17. A third track slot 10133 is further disposed on the first housing fastening bracket 1013. In addition, as shown in FIG. 18, the first swing rod component 1081 is provided with a first guide rod 10813, the first swing rod 10811 is connected to the second swing rod 10812 through the first guide rod 10813, the first guide rod 10813 is inserted into the third track slot 10133, and the first guide rod 10813 may slide along the third track slot 10133.

Similarly, a fourth track slot 10143 is further disposed on the second housing fastening bracket 1014. The second swing rod component 1082 is provided with a second guide rod 10823, the second guide rod 10823 is inserted into the fourth track slot 10143, and the second guide rod 10823 may slide along the fourth track slot 10143.

Figure 20:
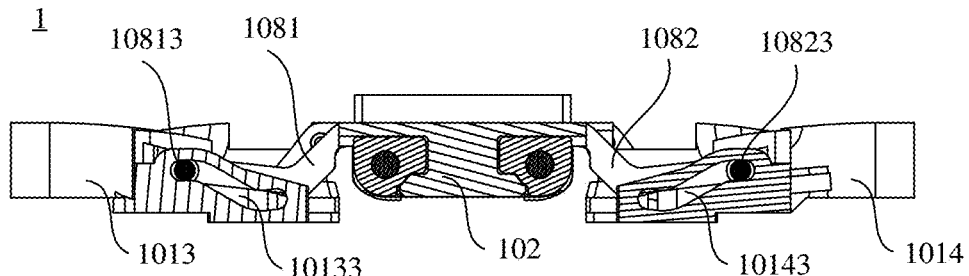
FIG. 20 is a sectional view of a hinge mechanism in a case in which an electronic device is in an unfolded state according to an embodiment of this application.
Figure 21:
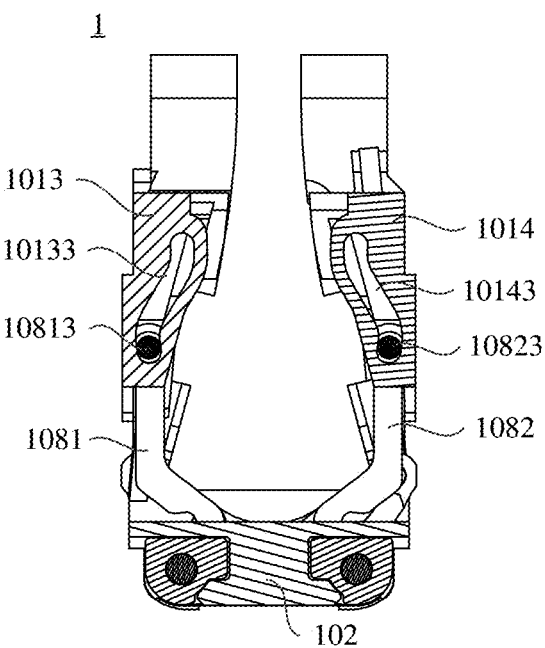
FIG. 21 is a sectional view of a hinge mechanism in a case in which an electronic device is in a folded state according to an embodiment of this application.

FIG. 20 is a sectional view of the hinge mechanism 1 in a case in which an electronic device is in an unfolded state according to an embodiment of this application. The sectional view may be used to show a relative position of the first guide rod 10813 in the third track slot 10133 and a relative position of the second guide rod 10823 in the fourth track slot 10143 in this state. In addition, FIG. 21 is a sectional view of the hinge mechanism 1 in a case in which an electronic device is in a folded state according to an embodiment of this application. The sectional view may be used to show a relative position of the first guide rod 10813 in the third track slot 10133 and a relative position of the second guide rod 10823 in the fourth track slot 10143 in this state. Refer to both FIG. 20 and FIG. 21. When the electronic device is in the unfolded state shown in FIG. 20, the first guide rod 10813 is located at an end portion that is of the third track slot 10133 and that is farthest from the main shaft 102, and the second guide rod 10823 is located at an end portion that is of the fourth track slot 10143 and that is farthest from the main shaft 102. In a process of the electronic device from the unfolded state shown in FIG. 20 to the folded state shown in FIG. 21, the first guide rod 10813 slides in the third track slot 10133 relative to the first housing fastening bracket 1013 in a direction close to the main shaft 102, and the second guide rod 10823 slides in the fourth track slot 10143 relative to the second housing fastening bracket 1014 in the direction close to the main shaft 102. In a process of the electronic device from the folded state shown in FIG. 21 to the unfolded state shown in FIG. 20, the first guide rod 10813 slides in the third track slot 10133 relative to the first housing fastening bracket 1013 in a direction away from the main shaft 102, and the second guide rod 10823 slides in the fourth track slot 10143 relative to the second housing fastening bracket 1014 in the direction away from the main shaft 102. When the electronic device is in the folded state shown in FIG. 21, the first guide rod 10813 is located at an end portion that is of the third track slot 10133 and that is closest to the main shaft 102, and the second guide rod 10823 is located at an end portion that is of the fourth track slot 10143 and that is closest to the main shaft 102.

It should be noted that forms of the third track slot 10133 and the fourth track slot 10143 are not specifically limited in this application. The third track slot 10133 and the fourth track slot 10143 may be obtained by fitting motion trajectories of the first rotating component 1011 and the second rotating component 1012 in a process of the electronic device from the unfolded state to the folded state and from the folded state to the unfolded state. In this way, folding and unfolding functions of the hinge mechanism 1 can be implemented; when the electronic device is in the unfolded state, the first door plate 104, the second door plate 105, and the main shaft 102 can provide a flat support surface for the flexible display; and when the electronic device is in the folded state, the first door plate 104, the second door plate 105, and the main shaft 102 can form screen accommodation space that matches a bending shape of a foldable portion of the flexible display.

It can be learned from the foregoing description of the hinge mechanism 1 provided in this application that the damping module 108 in the hinge mechanism 1 may provide a large damping force, and the damping force may be transferred to the housing fastening bracket on a corresponding side through the first swing rod component 1081 and the second swing rod component 1082. When the hinge mechanism 1 is used in the electronic device, the housing fastening bracket may transfer the damping force provided by the damping module 108 to a corresponding housing of the electronic device, so that the electronic device can stably remain in an unfolded state or a folded state, or remain in an intermediate state between the unfolded state and the folded state. This helps improve user experience. In addition, existence of a damping force generated by cam surfaces that abut against each other in the hinge mechanism 1 may implement a self-unfolding function of the electronic device at an end stage of the unfolded state and a self-folding function at an end stage of the folded state. In addition, under action of the damping force, a user can have an obvious jerk sense in a process of opening and closing the electronic device, to improve user experience.

Figure 22:
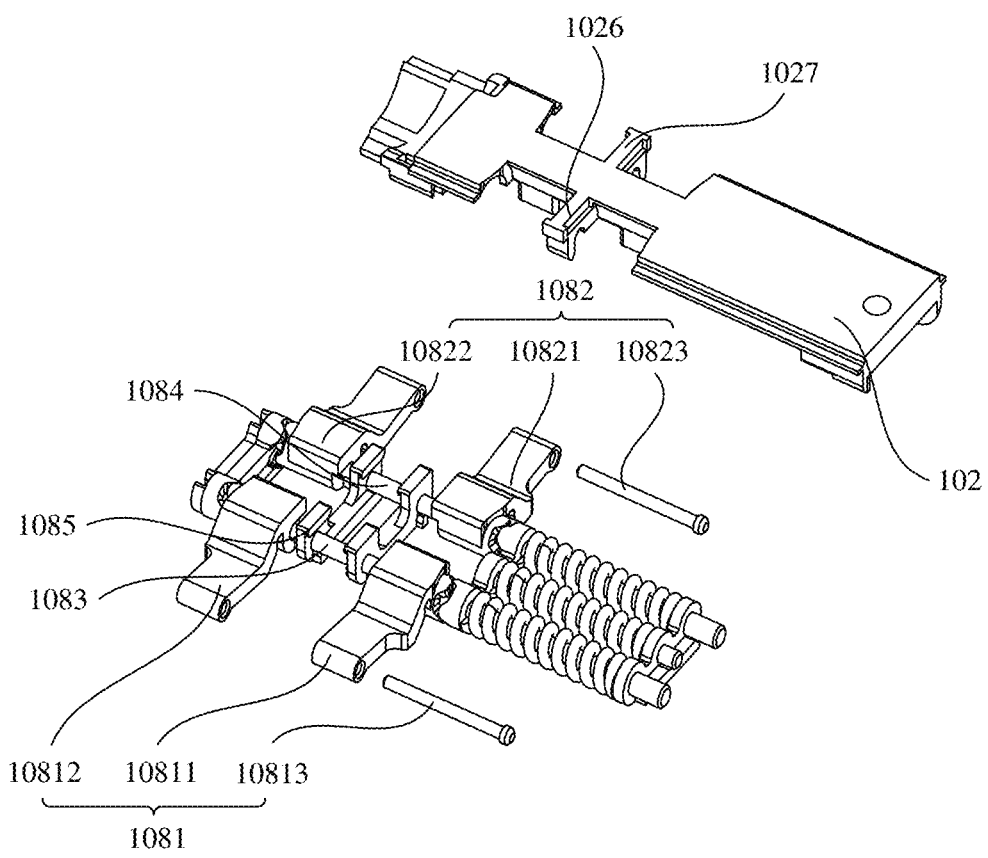
FIG. 22 is a diagram of another structure of a damping module according to an embodiment of this application.

FIG. 22 is a diagram of another structure of the damping module 108 according to an embodiment of this application. Different from the foregoing embodiment, in FIG. 22, each of the plurality of gaskets 1085 of the damping module 108 may be sleeved on both the first shaft 1083 and the second shaft 1084. In this way, rotation of each gasket 1085 relative to the first mounting portion 1026 and the second mounting portion 1027 may be limited by the first shaft 1083 and the second shaft 1084 that are disposed in parallel.

It should be noted that, in the embodiment shown in FIG. 22, at least a part of at least one gasket 1085 is located between the first swing rod 10811 and the second swing rod 10812, and at least a part of the at least one gasket 1085 is located between the third swing rod 10821 and the fourth swing rod 10822. For example, at least a part of the at least one gasket 1085 is located between the first swing rod 10811 and the first mounting portion 1026, at least a part of the at least one gasket 1085 is located between the second swing rod 10812 and the first mounting portion 1026, at least a part of the at least one gasket 1085 is located between the third swing rod 10821 and the second mounting portion 1027, and at least a part of the at least one gasket 1085 is located between the fourth swing rod 10822 and the second mounting portion 1027.

In addition, in the axial direction of the hinge mechanism 1, under action of the elastic force of the elastic component 1086, the first swing rod 10811 and the second swing rod 10812 press the at least a part of at least one gasket 1085 located between the first swing rod 10811 and the second swing rod 10812 toward the first mounting portion 1026, and the third swing rod 10821 and the fourth swing rod 10822 press the at least a part of the at least one gasket 1085 located between the third swing rod 10821 and the fourth swing rod 10822 toward the second mounting portion 1027.

In this application, a quantity of gaskets 1085 located between the first swing rod 10811 and the second swing rod 10812 is not limited, and there may be one or more gaskets 1085. Similarly, there may be one or more gaskets 1085 located between the third swing rod 10821 and the fourth swing rod 10822. For another structure of the damping module 108 shown in FIG. 22 and a manner of connecting the damping module 108 to the first housing fastening bracket 1013 and the second housing fastening bracket 1014, refer to the foregoing embodiment. Details are not described herein again.

The hinge mechanism 1 provided in the foregoing embodiments of this application may be used in, for example, the electronic device shown in FIG. 1 or FIG. 2. The first housing fastening bracket 1013 may be fastened to a housing located on a same side of the main shaft 102, and the second housing fastening bracket 1014 may be fastened to another housing. For example, the first housing fastening bracket 1013 may be configured to be fastened to the first housing 2 of the electronic device shown in FIG. 1, and the second housing fastening bracket 1014 may be configured to be fastened to the second housing 3 of the electronic device shown in FIG. 1. Based on this, it may be understood that a process in which the first housing fastening bracket 1013 and the second housing fastening bracket 1014 rotate in a direction facing each other or opposite to each other is a process in which the first housing 2 and the second housing 3 rotate in the direction facing each other or opposite to each other.

In addition, the flexible display of the electronic device may be fastened to the first housing 2 and the second housing 3, and a connection manner may be but is not limited to bonding. During specific implementation, the flexible display may be bonded to a partial region of the first support surface 2a of the first housing 2, and the flexible display may be bonded to a partial region of the second support surface 3a of the second housing 3, so that when the electronic device is in an unfolded state, the bearing surface 1a of the hinge mechanism 1, the first support surface 2a of the first housing 2, and the second support surface 3a of the second housing 3 can jointly provide flat support for the flexible display. Therefore, morphological integrity of the electronic device in the unfolded state can be ensured. In a process of the electronic device from the unfolded state to the folded state, the two housings rotate toward each other to drive the flexible display to rotate. This can effectively avoid deformation of the flexible display, to reduce a risk of damage to the flexible display.

It should be understood that, to implement the form of the electronic device, this application is not limited to embodiments of the hinge mechanisms 1 mentioned above, provided that the hinge mechanisms 1 in the following states can be implemented.

When the electronic device is in the unfolded state, the bearing surface 1a of the hinge mechanism 1, the first support surface 2a of the first housing, and the second support surface 3a of the second housing can jointly provide flat support for the flexible display. In a process of the electronic device from the unfolded state to the folded state, two housings of the electronic device can rotate in a direction facing each other, to drive the flexible display to bend. In a process of the electronic device from the folded state to the unfolded state, two housings of the electronic device can rotate in a direction opposite to each other, to drive the flexible display to unfold.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A hinge mechanism, used in a foldable electronic device, wherein the hinge mechanism is configured to be disposed opposite to a foldable portion of a flexible display of the electronic device that can be unfolded or folded by using the hinge mechanism, the hinge mechanism comprising:

a main shaft,
a first door plate;
a second door plate; and
a rotating module comprising a first rotating component, a second rotating component, a first housing fastening bracket, and a second housing fastening bracket;
wherein the first housing fastening bracket and the second housing fastening bracket are respectively disposed on two opposite sides of the main shaft;
wherein the first rotating component is located between the first housing fastening bracket and the second housing fastening bracket, and the second rotating component is located between the first housing fastening bracket and the second housing fastening bracket;
wherein the first rotating component comprises a first support arm, a first connecting member, and a first door plate fastening bracket;
wherein the first support arm is rotatably connected to the main shaft;
wherein the first support arm is slidably connected to the first housing fastening bracket;
wherein the first door plate fastening bracket is rotatably connected to the second housing fastening bracket;
wherein the first connecting member is located between the first support arm and the first door plate fastening bracket;
wherein the first connecting member is rotatably connected to the first support arm;
wherein the first connecting member is rotatably connected to the first door plate fastening bracket;
wherein the first connecting member is rotatably connected to the main shaft, or the first connecting member is slidably connected to the main shaft;
wherein the second rotating component comprises a second support arm, a second connecting member, and a second door plate fastening bracket;
wherein the second support arm is rotatably connected to the main shaft;
wherein the second support arm is slidably connected to the second housing fastening bracket;
wherein the second door plate fastening bracket is rotatably connected to the first housing fastening bracket;
wherein the second connecting member is located between the second support arm and the second door plate fastening bracket;
wherein the second connecting member is rotatably connected to the second support arm, and the second connecting member is rotatably connected to the second door plate fastening bracket;
wherein the second connecting member is rotatably connected to the main shaft, or the second connecting member is slidably connected to the main shaft;
wherein the first door plate is located on a side of the first door plate fastening bracket that faces the flexible display;
wherein the first door plate is fastened to the first door plate fastening bracket;
wherein the second door plate is located on a side of the second door plate fastening bracket that faces the flexible display; and
wherein the second door plate is fastened to the second door plate fastening bracket.

2. The hinge mechanism according to claim 1, wherein the first rotating component further comprises a first connecting rod that is located between the first support arm and the first connecting member, wherein the first support arm is rotatably connected to the first connecting rod, the first connecting member is rotatably connected to the first connecting rod, and an axis along which the first support arm rotates relative to the first connecting rod is parallel to but not coincident with an axis along which the first connecting member rotates relative to the first connecting rod; and
wherein the second rotating component further comprises a second connecting rod that is located between the second support arm and the second connecting member, wherein the second support arm is rotatably connected to the second connecting rod, the second connecting member is rotatably connected to the second connecting rod, and an axis along which the second support arm rotates relative to the second connecting rod is parallel to but not coincident with an axis along which the second connecting member rotates relative to the second connecting rod.

3. The hinge mechanism according to claim 1, wherein a first arc-shaped groove is disposed at an end portion of the first door plate fastening bracket and faces the second housing fastening bracket;

wherein a second arc-shaped rotating block is disposed on the second housing fastening bracket, the second arc-shaped rotating block being mounted in the first arc-shaped groove and being capable of sliding along a groove surface of the first arc-shaped groove;

wherein a second arc-shaped groove is disposed at an end portion of the second door plate fastening bracket and faces the first housing fastening bracket; and wherein a first arc-shaped rotating block is disposed on the first housing fastening bracket, the first arc-shaped rotating block being mounted in the second arc-shaped groove and being capable of sliding along a groove surface of the second arc-shaped groove.

4. The hinge mechanism according to claim 3, wherein an axis center at which the second housing fastening bracket rotates relative to the first door plate fastening bracket is located on the side of the first door plate fastening bracket that faces the flexible display, and wherein an axis center at which the first housing fastening bracket rotates relative to the second door plate fastening bracket is located on the side of the second door plate fastening bracket that faces the flexible display.

5. The hinge mechanism according to claim 1, wherein the main shaft is provided with a first track slot and a second track slot;

wherein the first connecting member comprises a first sliding block;

wherein the first sliding block is mounted in the first track slot and is capable of sliding relative to the main shaft along the first track slot to limit a motion trajectory of the first connecting member;

wherein the second connecting member comprises a second sliding block; and wherein the second sliding block is mounted in the second track slot and is capable of sliding relative to the main shaft along the second track slot to limit a motion trajectory of the second connecting member.

6. The hinge mechanism according to claim 1, wherein the main shaft is provided with a first track slot and a second track slot, the first track slot being an arc-shaped slot;

wherein the first connecting member comprises a first sliding block;

wherein the first sliding block is an arc-shaped sliding block that is mounted in the first track slot and is capable of rotating relative to the main shaft along the first track slot to limit a motion trajectory of the first connecting member;

wherein the second track slot is an arc-shaped slot; and wherein the second connecting member comprises a second arc-shaped sliding block that is mounted in the second track slot and is capable of rotating relative to the main shaft along the second track slot to limit a motion trajectory of the second connecting member.

7. The hinge mechanism according to claim 6, wherein the first connecting member comprises two first sliding blocks that are respectively disposed at two end portions of the first connecting member in an axial direction of the hinge mechanism, wherein axis centers at which the two first sliding blocks rotate relative to the main shaft coincide; and wherein the second connecting member comprises two second sliding blocks that are respectively disposed at two end portions of the second connecting member in the axial direction of the hinge mechanism, wherein axis centers at which the two second sliding blocks rotate relative to the main shaft coincide.

8. The hinge mechanism according to claim 1, wherein the hinge mechanism comprises a plurality of rotating modules including the rotating module, wherein the first door plate is fastened to each first door plate fastening bracket, and wherein the second door plate is fastened to each second door plate fastening bracket.

9. The hinge mechanism according to claim 1, wherein the hinge mechanism further comprises a synchronization component that comprises a synchronization gear is located between the first connecting member and the second connecting member in an axial direction of the hinge mechanism;

wherein a first gear surface is disposed at an end portion of the first connecting member that faces the synchronization gear, the first gear surface being engaged with a gear surface of the synchronization gear; and wherein a second gear surface is disposed at an end portion of the second connecting member that faces the synchronization gear, the second gear surface being engaged with the gear surface of the synchronization gear.

10. The hinge mechanism according to claim 9, wherein the first connecting member comprises two first sliding blocks, which are respectively disposed at two end portions of the first connecting member in the axial direction of the hinge mechanism;

wherein a first track slot corresponding to each first sliding block is disposed on the main shaft;

wherein each first sliding block is mounted in the corresponding first track slot and is capable of sliding or rotating relative to the main shaft along the corresponding first track slot;

wherein the first gear surface is disposed on the first sliding block facing the synchronization gear;

wherein the second connecting member comprises two second sliding blocks, which are respectively disposed at the two end portions of the second connecting member in the axial direction of the hinge mechanism;

wherein a second track slot corresponding to each second sliding block is disposed on the main shaft;

wherein each second sliding block is mounted in the corresponding second track slot and is capable of sliding or rotating relative to the main shaft along the second track slot; and wherein the second gear surface is disposed on the second sliding block facing the synchronization gear.

11. The hinge mechanism according to claim 1, wherein the hinge mechanism further comprises a damping module that comprises a first swing rod component, a second swing rod component, an elastic component, and a first conjoined cam;

wherein, in an axial direction of the hinge mechanism, the first swing rod component is located between the elastic component and the first conjoined cam, and the second swing rod component is located between the elastic component and the first conjoined cam;

wherein the first swing rod component comprises a first swing rod, a second swing rod, and a first guide rod;

wherein the first swing rod and the second swing rod are rotatably connected to the main shaft;

wherein the first swing rod and the second swing rod are connected through the first guide rod;

wherein a third track slot is disposed on the first housing fastening bracket;

wherein the first guide rod is inserted into the third track slot and is capable of sliding along the third track slot;

wherein the second swing rod component comprises a third swing rod, a fourth swing rod, and a second guide rod;

wherein the third swing rod and the fourth swing rod are rotatably connected to the main shaft;

wherein the third swing rod and the fourth swing rod are connected through the second guide rod;

wherein a fourth track slot is disposed on the second housing fastening bracket;

wherein the second guide rod is inserted into the fourth track slot and is capable of sliding along the fourth track slot;

wherein a first cam surface is disposed on an end surface of the first swing rod that faces the first conjoined cam;

wherein a third cam surface is disposed on an end surface of the third swing rod and faces the first conjoined cam;

wherein the first conjoined cam comprises a fifth cam surface disposed toward the first swing rod and a sixth cam surface disposed toward the third swing rod; and wherein, in the axial direction of the hinge mechanism, under action of an elastic force of the elastic component, the first cam surface abuts against the fifth cam surface, and the third cam surface abuts against the sixth cam surface.

12. The hinge mechanism according to claim 11, wherein the damping module further comprises a second conjoined cam;

wherein the first swing rod component is located between the first conjoined cam and the second conjoined cam;

wherein the second swing rod component is located between the first conjoined cam and the second conjoined cam;

wherein a second cam surface is disposed on an end surface of the second swing rod that faces the second conjoined cam;

wherein a fourth cam surface is disposed on an end surface of the fourth swing rod that faces the second conjoined cam;

wherein the second conjoined cam comprises a seventh cam surface disposed toward the second swing rod and an eighth cam surface disposed toward the fourth swing rod; and wherein, in the axial direction of the hinge mechanism, under the action of the elastic force of the elastic component, the second cam surface abuts against the seventh cam surface, and the fourth cam surface abuts against the eighth cam surface.

13. The hinge mechanism according to claim 11, wherein the main shaft further comprises a first mounting portion and a second mounting portion;

wherein, in the axial direction of the hinge mechanism, the first mounting portion is located between the first swing rod and the second swing rod;

wherein the first swing rod and the second swing rod are rotatably connected to the first mounting portion through a first shaft;

wherein, in the axial direction of the hinge mechanism, the second mounting portion is located between the third swing rod and the fourth swing rod; and wherein the third swing rod and the fourth swing rod are rotatably connected to the second mounting portion through a second shaft.

14. The hinge mechanism according to claim 13, wherein the damping module further comprises a plurality of gaskets, at least one gasket being located between the first swing rod and the second swing rod;

wherein, in the axial direction of the hinge mechanism, under the action of the elastic force of the elastic component, the first swing rod and the second swing rod press the at least one gasket located between the first swing rod and the second swing rod toward the first mounting portion;

wherein at least one other gasket is located between the third swing rod and the fourth swing rod; and wherein, in the axial direction of the hinge mechanism, under the action of the elastic force of the elastic component, the third swing rod and the fourth swing rod press the at least one other gasket located between the third swing rod and the fourth swing rod toward the second mounting portion.

15. The hinge mechanism according to claim 14, wherein, in the axial direction of the hinge mechanism, a first slot is disposed on at least one side surface of the first mounting portion, and the at least one gasket located between the first swing rod and the second swing rod is clamped into the first slot;

wherein, in a direction in which the first swing rod component rotates relative to the main shaft, the at least one gasket located between the first swing rod and the second swing rod is fastened to the first mounting portion;

wherein, in the axial direction of the hinge mechanism, a second slot is disposed on at least one side surface of the second mounting portion, and the at least one gasket located between the third swing rod and the fourth swing rod is clamped into the second slot; and wherein, in a direction in which the second swing rod component rotates relative to the main shaft, the at least one gasket located between the third swing rod and the fourth swing rod is fastened to the second mounting portion.

16. The hinge mechanism according to claim 13, wherein the damping module further comprises a plurality of gaskets, each gasket being sleeved on the first shaft and the second shaft, wherein at least a part of at least one gasket is located between the first swing rod and the second swing rod;

wherein, in the axial direction of the hinge mechanism, under the action of the elastic force of the elastic component, the first swing rod and the second swing rod press the at least a part of the at least one gasket located between the first swing rod and the second swing rod toward the first mounting portion;

wherein at least a part of the at least one gasket is located between the third swing rod and the fourth swing rod; and wherein, in the axial direction of the hinge mechanism, under the action of the elastic force of the elastic component, the third swing rod and the fourth swing rod press the at least a part of the at least one gasket located between the third swing rod and the fourth swing rod toward the second mounting portion.

17. An electronic device, comprising:
a first housing;
a second housing;

a hinge mechanism, wherein the first housing and the second housing are respectively disposed on two opposite sides of the hinge mechanism;

a flexible display fastened to the first housing and the second housing and continuously covering the first housing, the second housing, and the hinge mechanism, wherein the hinge mechanism is disposed opposite to a foldable portion of the flexible display;

a first housing fastening bracket fastened to the first housing; and a second housing fastening bracket fastened to the second housing;

wherein the hinge mechanism comprises a main shaft, a rotating module, a first door plate, and a second door plate;

wherein the rotating module comprises a first rotating component, a second rotating component, the first housing fastening bracket, and the second housing fastening bracket;

wherein the first housing fastening bracket and the second housing fastening bracket are respectively disposed on two opposite sides of the main shaft;

wherein the first rotating component is located between the first housing fastening bracket and the second housing fastening bracket and the second rotating component is located between the first housing fastening bracket and the second housing fastening bracket;

wherein the first rotating component comprises a first support arm, a first connecting member, and a first door plate fastening bracket;

wherein the first support arm is rotatably connected to the main shaft, the first support arm being slidably connected to the first housing fastening bracket;

wherein the first door plate fastening bracket is rotatably connected to the second housing fastening bracket;

wherein the first connecting member is located between the first support arm and the first door plate fastening bracket and is rotatably connected to the first support arm and rotatably connected to the first door plate fastening bracket;

wherein the first connecting member is rotatably connected to the main shaft or the first connecting member is slidably connected to the main shaft;

wherein the second rotating component comprises a second support arm, a second connecting member, and a second door plate fastening bracket;

wherein the second support arm is rotatably connected to the main shaft and is slidably connected to the second housing fastening bracket;

wherein the second door plate fastening bracket is rotatably connected to the first housing fastening bracket;

wherein the second connecting member is located between the second support arm and the second door plate fastening bracket and is rotatably connected to the second support arm and rotatably connected to the second door plate fastening bracket; and wherein the second connecting member is rotatably connected to the main shaft, or the second connecting member is slidably connected to the main shaft; and wherein the first door plate is located on a side of the first door plate fastening bracket that faces the flexible display and is fastened to the first door plate fastening bracket; and wherein the second door plate is located on a side of the second door plate fastening bracket that faces the flexible display and is fastened to the second door plate fastening bracket.

18. The electronic device according to claim 17, wherein the first rotating component further comprises a first connecting rod that is located between the first support arm and the first connecting member;

wherein the first support arm is rotatably connected to the first connecting rod;

wherein the first connecting member is rotatably connected to the first connecting rod;

wherein an axis along which the first support arm rotates relative to the first connecting rod is parallel to but not coincident with an axis along which the first connecting member rotates relative to the first connecting rod;

wherein the second rotating component further comprises a second connecting rod that is located between the second support arm and the second connecting member;

wherein the second support arm is rotatably connected to the second connecting rod;

wherein the second connecting member is rotatably connected to the second connecting rod; and wherein an axis along which the second support arm rotates relative to the second connecting rod is parallel to but not coincident with an axis along which the second connecting member rotates relative to the second connecting rod.

19. The electronic device according to claim 17, wherein a first arc-shaped groove is disposed at an end portion of the first door plate fastening bracket that faces the second housing fastening bracket;

wherein a second arc-shaped rotating block is disposed on the second housing fastening bracket, the second arc-shaped rotating block being mounted in the first arc-shaped groove and being capable of sliding along a groove surface of the first arc-shaped groove;

wherein a second arc-shaped groove is disposed at an end portion of the second door plate fastening bracket that faces the first housing fastening bracket; and wherein a first arc-shaped rotating block is disposed on the first housing fastening bracket, the first arc-shaped rotating block being mounted in the second arc-shaped groove and being capable of sliding along a groove surface of the second arc-shaped groove.

20. The electronic device according to claim 19, wherein an axis center at which the second housing fastening bracket rotates relative to the first door plate fastening bracket is located on the side of the first door plate fastening bracket that faces the flexible display, and an axis center at which the first housing fastening bracket rotates relative to the second door plate fastening bracket is located on the side of the second door plate fastening bracket that faces the flexible display.

* * * * *